(12) United States Patent
Yamaguchi

(10) Patent No.: US 12,572,248 B2
(45) Date of Patent: Mar. 10, 2026

(54) DETECTING DEVICE

(71) Applicant: Japan Display Inc., Tokyo (JP)

(72) Inventor: Hiroshi Yamaguchi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 19/072,245

(22) Filed: Mar. 6, 2025

(65) Prior Publication Data

US 2025/0199652 A1 Jun. 19, 2025

Related U.S. Application Data

(63) Continuation of application No. 18/418,616, filed on Jan. 22, 2024, now Pat. No. 12,271,564.

(30) Foreign Application Priority Data

Jan. 31, 2023 (JP) ................................. 2023-013277

(51) Int. Cl.
G06F 3/044 (2006.01)
G06F 3/041 (2006.01)
(52) U.S. Cl.
CPC .......... G06F 3/0446 (2019.05); G06F 3/0412 (2013.01)

(58) Field of Classification Search
None
See application file for complete search history.

(56) References Cited

U.S. PATENT DOCUMENTS

| | | | | |
|---|---|---|---|---|
| 9,151,792 B1 * | 10/2015 | Kremin | .................. | G06F 1/169 |
| 2022/0057664 A1 * | 2/2022 | Higano | .............. | G02F 1/13338 |
| 2023/0297198 A1 * | 9/2023 | Yamaguchi | .......... | G06F 3/0446 |
| | | | | 345/173 |

* cited by examiner

*Primary Examiner* — Stephen T. Reed
(74) *Attorney, Agent, or Firm* — K&L Gates LLP

(57) ABSTRACT

A detecting device includes a plurality of sensor electrodes provided to a detection region, a power supply circuit configured to generate a second reference potential that fluctuates periodically based on a first power supply potential that is substantially constant with respect to a first reference potential serving as a fixed potential and generate a second power supply potential that is substantially constant with respect to the second reference potential, and an AFE circuit configured to supply a drive signal to the sensor electrodes, acquire a detection signal generated in the sensor electrodes, and output a square wave signal in synchronization with the drive signal.

19 Claims, 18 Drawing Sheets

DETECTING DEVICE

CROSS-REFERENCE TO RELATED APPLICATION

The present application is a continuation application of U.S. application Ser. No. 18/418,616, filed on Jan. 22, 2024, which application claims the benefit of priority from Japanese Patent Application No. 2023-013277 filed on Jan. 31, 2023, the entire contents of which are incorporated herein by reference.

BACKGROUND

1. Technical Field

The present invention relates to a detecting device.

2. Description of the Related Art

Widely known are detecting devices that detect proximity of an object (e.g., U.S. Pat. No. 9,151,792). Such a detecting device with what is called a hover detection (proximity detection) function includes a plurality of detection electrodes and a shield electrode disposed around a detection region provided with the detection electrodes, and the shield electrode is supplied with electric signals.

To improve the accuracy in hover detection, it is conceivable to set the ground potential of a detection blow including a detection circuit to a potential that fluctuates periodically in synchronization with signals for detection and to supply the potential to the shield electrode as the ground potential. In such a configuration, it is required to reduce the cost and size for electrically insulating a power supply path and a signal transmission path to the detection block.

An object of the present disclosure is to provide a detecting device that can be manufactured at a lower cost and in a smaller size.

SUMMARY

A detecting device according to an embodiment of the present disclosure includes a plurality of sensor electrodes provided to a detection region, a power supply circuit configured to generate a second reference potential that fluctuates periodically based on a first power supply potential that is substantially constant with respect to a first reference potential serving as a fixed potential and generate a second power supply potential that is substantially constant with respect to the second reference potential, and an AFE circuit configured to supply a drive signal to the sensor electrodes, acquire a detection signal generated in the sensor electrodes, and output a square wave signal in synchronization with the drive signal. The second reference potential is a potential that fluctuates in synchronization with the square wave signal, and the AFE circuit is supplied with the second reference potential from the power supply circuit and operates based on the second power supply potential generated by the power supply circuit.

BRIEF DESCRIPTION OF THE DRAWINGS

FIG. 4 is a schematic of a second coupling example between the sensor circuit of the detecting device according to the embodiment and the display panel;

FIG. 5 is a diagram of an exemplary block configuration of the detecting device according to the embodiment;

FIG. 12 is a diagram of an exemplary block configuration of the detecting device according to a first embodiment;

FIG. 14 is a block diagram of an exemplary main configuration of a power supply circuit according to the first embodiment;

FIG. 16 is a diagram of an exemplary block configuration of the detecting device according to a second embodiment;

FIG. 19 is a diagram of an exemplary operation of the power supply circuit according to the second embodiment.

DETAILED DESCRIPTION

Figure 1:
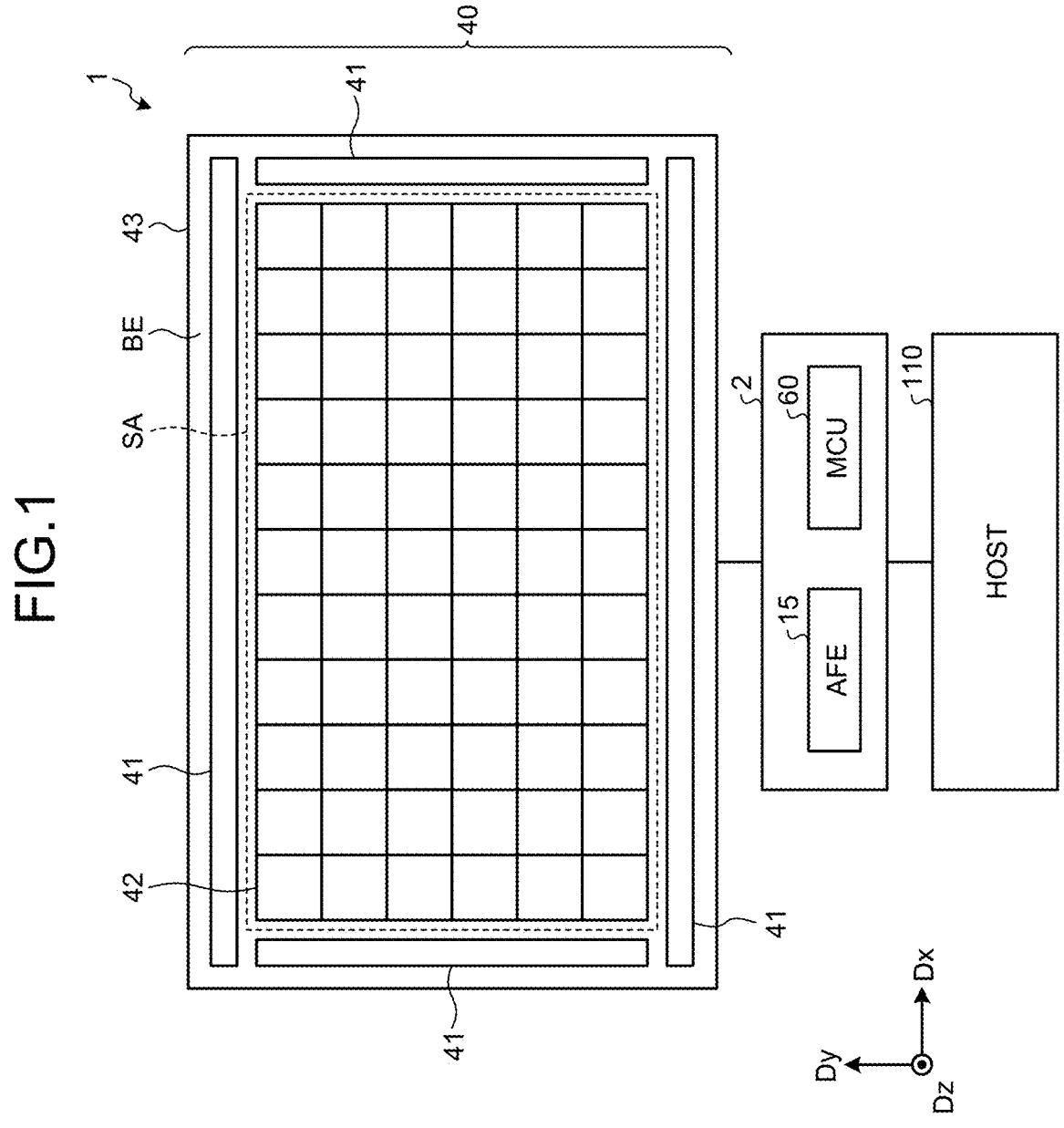
FIG. 1 is a diagram of a main configuration of a detecting device according to an embodiment.

Exemplary aspects (embodiments) to embody the present invention are described below in greater detail with reference to the accompanying drawings. The contents described in the embodiments below are not intended to limit the present invention. Components described below include components easily conceivable by those skilled in the art and components substantially identical therewith. Furthermore, the components described below may be appropriately combined. What is disclosed herein is given by way of example only, and appropriate modifications made without departing from the spirit of the present invention and easily conceivable by those skilled in the art naturally fall within the scope of the present invention. To make the explanation more specific, the drawings may possibly illustrate the width, the thickness, the shape, and other elements of each component more schematically than the actual aspect. These elements, however, are given by way of example only and are not intended to limit interpretation of the present invention. In the present specification and the drawings, components similar to those previously described with reference to previous drawings are denoted by like reference numerals, and detailed explanation thereof may be omitted as appropriate.

In the present specification and the claims, when the term "on" is used to describe an aspect where a first structure is disposed on a second structure, it includes both of the following cases unless otherwise noted: a case where the first structure is disposed directly on and in contact with the second structure, and a case where the first structure is disposed on the second structure with still another structure interposed therebetween.

FIG. 1 is a diagram of a main configuration of a detecting device 1 according to an embodiment. As illustrated in FIG. 1, the detecting device 1 includes a sensor circuit 40 and a detection circuit 2.

The sensor circuit 40 is provided with a plurality of sensor electrodes (first electrodes) 42 and a plurality of peripheral electrodes (second electrodes) 41 on a substrate 43. The detecting device 1 is a hover detecting device that detects the position and movement of an object to be detected, such as a finger, (hereinafter also referred to as "hover detection") when the object to be detected is not in contact with the detection surface of the sensor circuit 40. The detecting device 1 according to the present disclosure performs self-capacitance hover detection.

The sensor circuit 40 has a detection region SA and a peripheral region BE outside the detection region SA. The detection region SA is a region provided with the sensor electrodes 42 to detect the object to be detected in proximity to the detection surface. The peripheral region BE is a region positioned outside the detection region SA and not provided with the sensor electrodes 42. The peripheral region BE is a region provided with the peripheral electrodes 41 along the four sides of the detection region SA.

In the following description, a first direction Dx is one direction in a plane parallel to the substrate 43. A second direction Dy is one direction in the plane parallel to the substrate 43 and is orthogonal to the first direction Dx. The second direction Dy may intersect the first direction Dx without being orthogonal thereto. A third direction Dz is a direction orthogonal to the first direction Dx and the second direction Dy and is normal to the main surface of the substrate 43. The term "plan view" refers to the positional relation when viewed from a direction perpendicular to the substrate 43.

A plurality of sensor electrodes 42 are disposed in a matrix (row-column configuration) in the detection region SA of the substrate 43. In other words, the sensor electrodes 42 are adjacently arrayed in the first direction Dx and the second direction Dy. The sensor electrodes 42 are each electrically coupled to an AFE circuit 15 via wiring (not illustrated).

The peripheral electrodes 41 are disposed surrounding the sensor electrodes 42 provided in the detection region SA.

The sensor circuit 40 is coupled to the detection circuit 2. The detection circuit 2 includes an AFE circuit 15, a control circuit 60, and other components. The AFE circuit 15 performs hover detection based on the output from the sensor circuit 40. The control circuit 60 controls the hover detection operation performed by the AFE circuit 15. The AFE circuit 15 is an analog front-end (AFE) circuit, for example. The control circuit 60 includes a micro control unit (MCU), for example.

The detection circuit 2 is coupled to a processing unit (external processing unit) 110. The processing unit 110 is a device that functions as a host computer (HOST) of the detecting device 1 according to the embodiment. The processing unit 110 is a point of sale (POS) cash register terminal, for example. The processing unit 110 is not limited thereto and may be any terminal that can accept hover operations on the detecting device 1.

Figure 2A:
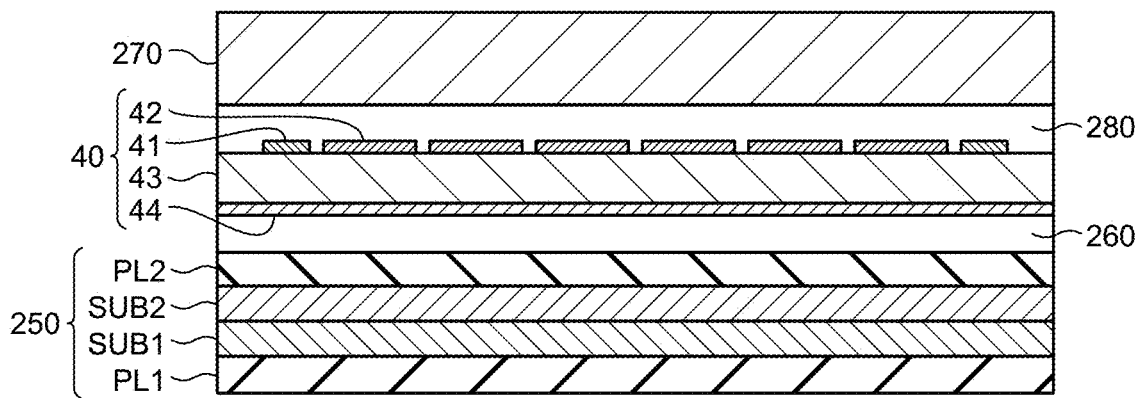
FIG. 2A is a schematic of an exemplary schematic sectional configuration in which a sensor circuit of the detecting device according to the embodiment is stacked on a display panel.
Figure 3:
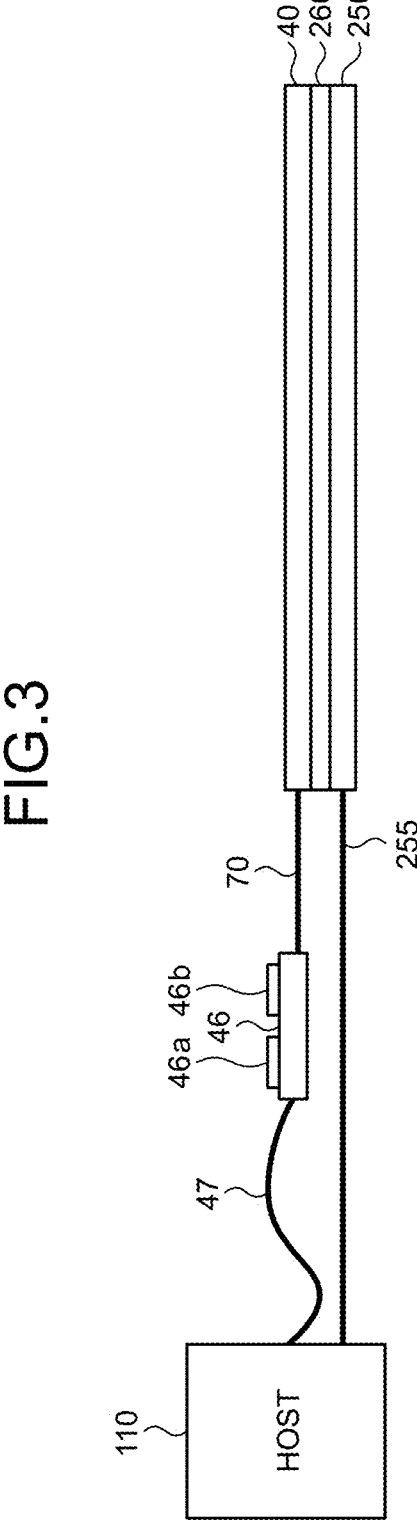
FIG. 3 is a schematic of a first coupling example between the sensor circuit of the detecting device according to the embodiment and the display panel.

FIG. 2A is a schematic of an exemplary schematic sectional configuration in which the sensor circuit 40 of the detecting device 1 according to the embodiment is stacked on a display panel 250. The display panel 250 is a display panel that displays and outputs images. FIG. 3 is a schematic of a first coupling example between the sensor circuit 40 of the detecting device 1 according to the embodiment and the display panel 250. FIG. 3 illustrates an example of what is called an on-cell device in which the sensor circuit 40 of the detecting device 1 according to the embodiment is mounted on the display panel 250.

The display panel 250 includes an array substrate SUB1, a counter substrate SUB2, a first polarizing plate PL1, and a second polarizing plate PL2. The first polarizing plate PL1, the array substrate SUB1, the counter substrate SUB2, and the second polarizing plate PL2 are stacked in this order.

The array substrate SUB1 is a drive circuit substrate for driving a plurality of pixels. The counter substrate SUB2 is provided facing the array substrate SUB1. A liquid crystal layer serving as a display function layer is provided between the array substrate SUB1 and the counter substrate SUB2.

The sensor circuit 40 is bonded to the top of the display panel 250 with an adhesive layer 260 interposed therebetween. The adhesive layer 260 is an optical clear adhesive (OCA), for example.

The sensor electrodes 42 and the peripheral electrodes 41 are provided on the same substrate 43. The substrate 43 is a film- or plate-like member made of insulating material and is a resin film or a glass substrate, for example. The sensor electrodes 42 and the peripheral electrodes 41 are not necessarily provided in the same layer of the substrate 43 and may be provided in different layers of the substrate 43. The sensor electrode 42 is made of translucent conductive material, such as indium tin oxide (ITO) and indium zinc oxide (IZO). The peripheral electrode 41 may be made of the same material as that of the sensor electrode 42 or material, such as metal material, different from that of the sensor electrode 42.

A cover member 270 is provided on the sensor circuit 40 with an adhesive layer 280 interposed therebetween. The adhesive layer 280 is an OCA, for example. A shield electrode 44 is provided on the surface of the substrate 43 opposite to the surface provided with the sensor electrodes 42 and the peripheral electrodes 41. In other words, the shield electrode 44 is provided between the display panel 250 and the surface of the sensor circuit 40 opposite to the surface provided with the cover member 270. The adhesive layer 260 is in contact with the shield electrode 44 provided to the sensor circuit 40.

The shield electrode 44 contains translucent conductive oxide, such as ITO and IZO, or metal, for example. Examples of the metal include, but are not limited to, molybdenum, tungsten, tantalum, aluminum, copper, etc. (0-valent metal). The shield electrode 44 may have a single-layered or multilayered structure. The shield electrode 44 that has a multilayered structure may include an oxide-containing layer and a metal-containing layer. The shield electrode 44 simply needs to be a transparent and conductive layer and can be called a transparent conductive layer.

The shield electrode 44 is supplied with a second reference potential, which will be described later. The shield electrode 44 is also supplied with the same signal as that supplied to the peripheral electrodes 41. With the shield electrode 44 provided between the sensor circuit 40 and the display panel 250, the present embodiment can block noise output from the display panel 250 and superimposed on the sensor electrodes 42 of the sensor circuit 40.

The cover member 270 is bonded to the top of the sensor circuit 40. The cover member 270 is a glass substrate or a resin substrate, for example. The upper surface of the cover member 270 serves as the detection surface in hover detection.

Figure 2B:
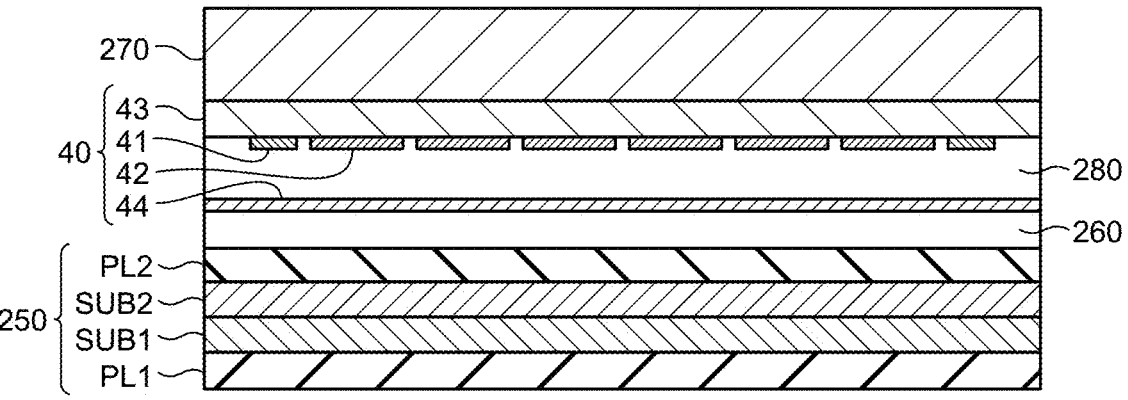
FIG. 2B is a schematic of a modification of the schematic sectional configuration illustrated in FIG. 2A.

Instead of the schematic sectional configuration illustrated in FIG. 2A, the schematic sectional configuration illustrated in FIG. 2B may be employed. FIG. 2B is a schematic of a modification of the schematic sectional configuration illustrated in FIG. 2A.

The display panel 250 is a liquid crystal display (LCD) panel, for example. In this case, a backlight is provided on the side opposite to the sensor circuit 40 across the display panel 250. The display panel 250 is not limited thereto and may be an organic light-emitting diode (OLED) display panel or an inorganic EL display panel (micro-LED or mini-LED), for example. Alternatively, the display panel 250 may be an electrophoretic display (EPD) panel including electrophoretic elements as display elements.

In what is called an on-cell device configuration illustrated in FIG. 3, the detecting device 1 includes a flexible printed circuit (FPC) 70. The FPC 70 is coupled to a printed circuit board (PCB) 46. The PCB 46 is provided with various circuits constituting the detection circuit 2. FIG. 3 illustrates circuits 46a and 46b as an example of the various circuits constituting the detection circuit 2. The circuits 46a and 46b are circuits that function as the AFE circuit 15 and the control circuit 60, for example.

The display panel 250 includes an FPC 255. The FPC 255 is provided with various circuits related to the operations of the display panel 250. The PCB 46 is coupled to the processing unit 110 via a cable 47. The cable 47 has a function of transmitting signals generated between the detecting device 1 and the processing unit 110. The cable 47 is a universal serial bus (USB) cable, for example.

Figure 4:
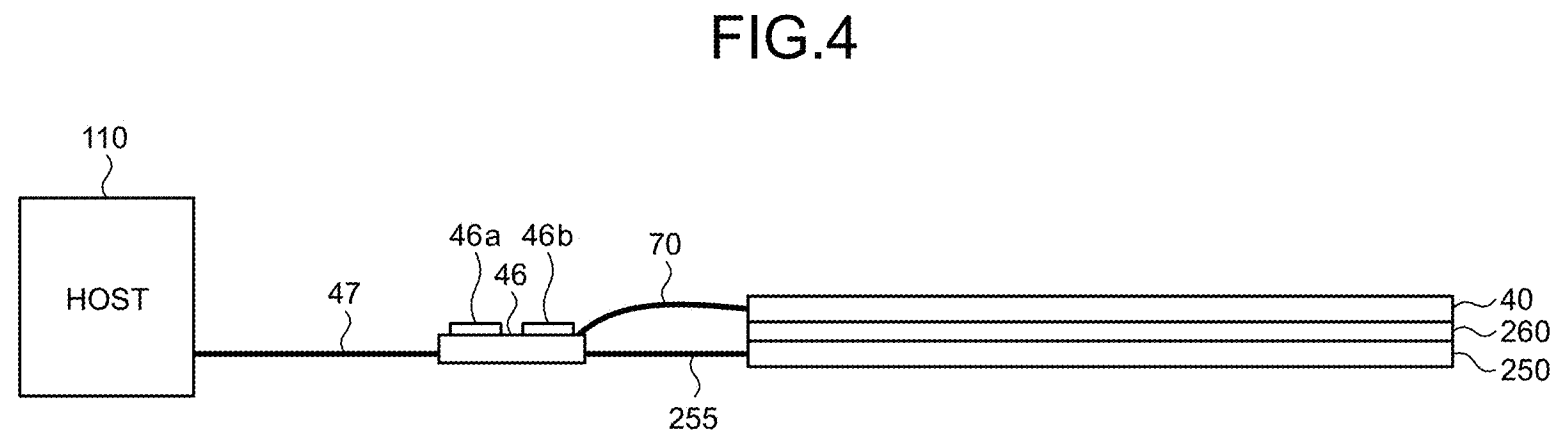

FIG. 4 is a schematic of a second coupling example between the sensor circuit 40 of the detecting device 1 according to the embodiment and the display panel 250. FIG. 4 illustrates an example of what is called an in-cell or hybrid device in which the sensor circuit 40 of the detecting device 1 according to the embodiment is incorporated and integrated with the display panel 250. Incorporating and integrating the sensor circuit 40 of the detecting device 1 according to the embodiment with the display panel 250 includes, for example, sharing some components, such as substrates and electrodes, used for the display panel 250 and some components, such as substrates and electrodes, used for the sensor circuit 40 of the detecting device 1 according to the embodiment.

In what is called an in-cell or hybrid device configuration illustrated in FIG. 4, the FPC 255 is coupled to the PCB 46. In this case, the cable 47 further has a function of transmitting signals generated between the display panel 250 and the processing unit 110.

Figure 5:
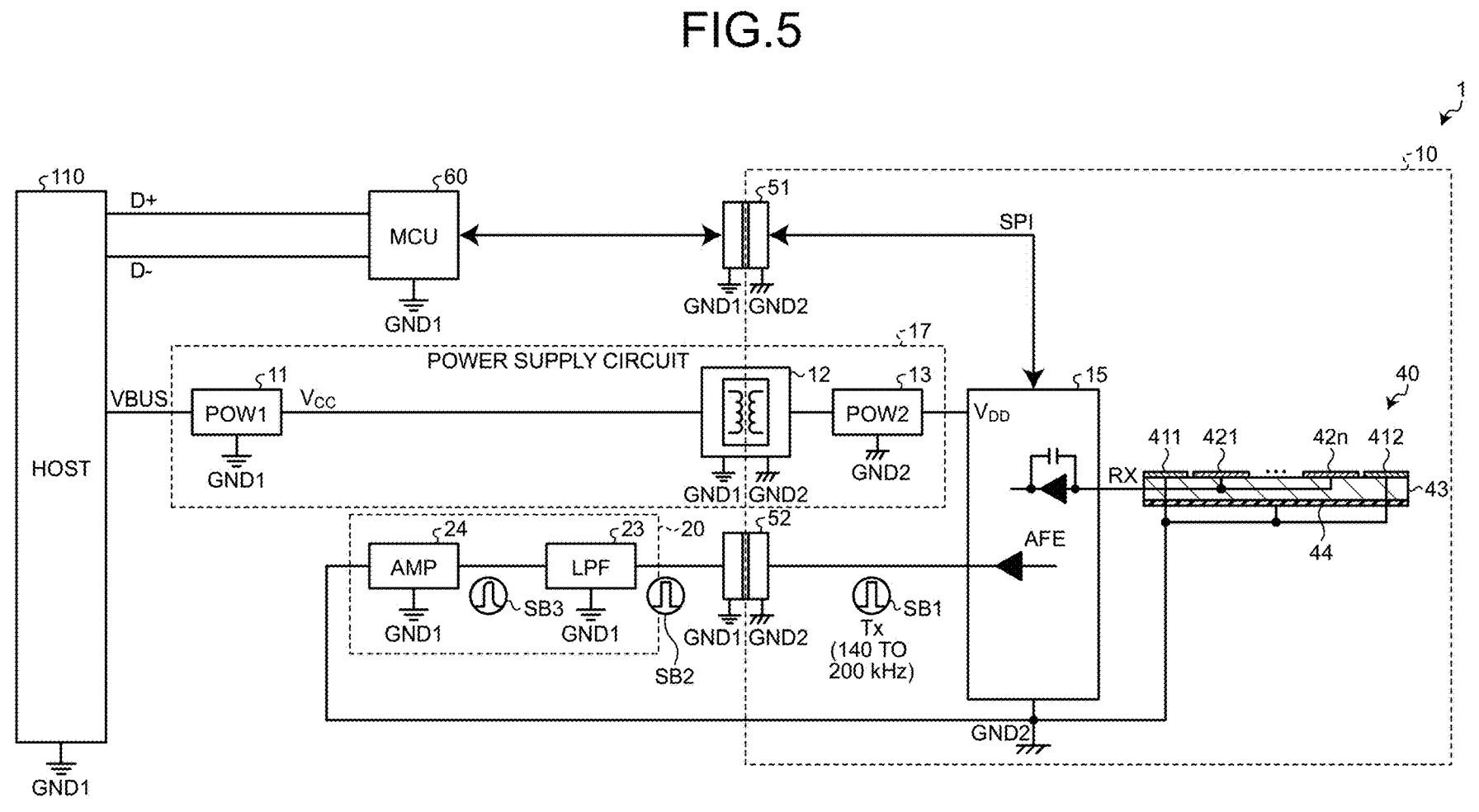

Before describing a specific configuration of the detecting device 1 according to a first embodiment, the configuration and the operation of the detecting device according to the embodiment is described. FIG. 5 is a diagram of an exemplary block configuration of the detecting device 1 according to the embodiment.

As illustrated in FIG. 5, the detecting device 1 includes a power supply circuit 17, a reference potential generation circuit 20, a first isolator 51, and a second isolator 52 besides the sensor circuit 40, the AFE circuit 15, and the control circuit 60 described above. The sensor circuit 40 and the AFE circuit 15 according to the present disclosure are included in a detection block 10. The control circuit 60 and the reference potential generation circuit 20 operate with a first reference potential GND1, which is a fixed potential, as the ground potential. The sensor circuit 40 and the AFE circuit 15 in the detection block 10 operate with a second reference potential GND2 generated by the reference potential generation circuit 20 as the ground potential.

The AFE circuit 15 generates drive signals for self-capacitance hover detection and outputs them to the sensor electrodes 42.

Signals between the AFE circuit 15 and the control circuit 60 according to the present disclosure are transmitted by a serial peripheral interface (SPI), which is a clock synchronous serial interface. The serial interface for transmitting the signals between the AFE circuit 15 and the control circuit 60 is not limited to SPI.

The first isolator 51 isolates the control circuit 60 from the detection block 10 and transmits the signals between the AFE circuit 15 and the control circuit 60.

The first isolator 51 is a magnetic isolation digital isolator, for example. The first isolator 51 can perform bidirectional transmission of transmission output from the control circuit 60 to the detection block 10 and transmission output from the detection block 10 to the control circuit 60.

Specifically, electrical signals output from the terminal on the control circuit 60 side of the first isolator 51 with the first reference potential GND1 (fixed potential) as the ground potential are synchronized with electrical signals output from the detection block 10 with the second reference potential GND2 as the ground potential.

Electrical signals output from the terminal on the detection block 10 side of the first isolator 51 with the second reference potential GND2 as the ground potential are synchronized with electrical signals output from the control circuit 60 with the first reference potential GND1 (fixed potential) as the ground potential.

The AFE circuit 15 transmits and receives signals, such as sensing data and various control commands, to and from the control circuit 60 via the first isolator 51. Specifically, the AFE circuit 15 outputs sensing data indicating results of hover detection to the control circuit 60 via the first isolator 51, for example.

The AFE circuit 15 according to the present disclosure generates square wave signals Tx and outputs them to the reference potential generation circuit 20 via the second isolator 52. The square wave signal Tx is a reference signal for generating drive signals output to the sensor electrodes 42. The frequency of the drive signal for self-capacitance hover detection (hereinafter also referred to as "drive frequency") is substantially equal to the fundamental frequency of the square wave signal Tx. The setting range of the drive frequency is 140 kHz to 200 kHz, for example. The square wave signal Tx contains fundamental frequency components and harmonic components of the drive signal output to the sensor electrodes 42. The setting range of the drive frequency in the AFE circuit 15 is given by way of example only, and the embodiment is not limited thereto.

The second isolator 52 isolates the detection block 10 from the reference potential generation circuit 20 and transmits the square wave signals Tx output from the AFE circuit 15.

Signal transmission between the detection block 10 and the reference potential generation circuit 20 by the second isolator 52 is performed by an optical isolation method using a photocoupler, for example. The method of signal transmission between the detection block 10 and the reference potential generation circuit 20 by the second isolator 52 is not limited to an optical isolation method and may be a magnetic isolation method like the first isolator 51 or a capacitive isolation method using the principle of a capacitor, for example.

Specifically, the square wave signals output from the terminal on the reference potential generation circuit 20 side of the second isolator 52 with the first reference potential GND1 (fixed potential) as the ground potential are synchronized with the square wave signals Tx output from the AFE circuit 15 with the second reference potential GND2 as the ground potential. In FIG. 5, the waveform of the square wave signal Tx output from the AFE circuit 15 is schematically illustrated as a waveform SB1, and the waveform of the square wave signal output to the reference potential generation circuit 20 via the second isolator 52 is schematically illustrated as a waveform SB2.

The power supply circuit 17 is provided on a power supply path from an external device (processing unit 110 according to the present embodiment) that operates with the first reference potential GND1 as the ground potential. The power supply circuit 17 isolates the processing unit 110 from the detection block 10 and supplies electric power supplied from a power supply line VBUS of a USB cable, for example, to the detection block 10. The electric power source to the power supply circuit 17 is not limited to the processing unit 110. The power supply circuit 17 may be supplied with electric power from an AC adapter or other external power sources, for example.

The power supply circuit 17 includes a first voltage conversion circuit (POW1) 11, an isolation type DC-DC converter 12, and a second voltage conversion circuit (POW2) 13.

The first voltage conversion circuit 11 operates with the first reference potential GND1 as the ground potential. The first voltage conversion circuit 11 converts the potential of the electric power supplied from the processing unit 110 via the power supply line VBUS of the USB cable, for example, into a first power supply potential $V_{CC}$ that is substantially constant with respect to the first reference potential GND1.

The isolation type DC-DC converter 12 is provided between the first voltage conversion circuit 11 and the second voltage conversion circuit 13. Electric power transmission between the first voltage conversion circuit 11 and the second voltage conversion circuit 13 by the isolation type DC-DC converter 12 is performed by a magnetic isolation method like the first isolator 51.

The isolation type DC-DC converter 12 supplies electric power to the coil on the processing unit 110 side, thereby causing the coil to generate a magnetic field. The coil on the detection block 10 side is provided within a range of being affected by the magnetic field generated by the coil on the processing unit 110 side.

The coil on the detection block 10 side generates an induced electromotive force due to the magnetic field generated by the coil on the processing unit 110 side. The electric power generated in the coil on the detection block 10 side is converted into a second power supply potential that fluctuates in synchronization with the second reference potential GND2 and is output to the second voltage conversion circuit 13.

The second voltage conversion circuit 13 operates with the second reference potential GND2 as the ground potential. The second voltage conversion circuit 13 converts the electric power supplied from the isolation type DC-DC converter 12 into a power supply potential $V_{DD}$ of the AFE circuit 15. The power supply potential $V_{DD}$ includes an analog power supply potential of the AFE circuit 15 and an input/output power supply potential of the AFE circuit 15, for example.

The control circuit 60 transmits and receives signals, such as various kinds of information on sensing data and control commands, to and from the processing unit 110.

The control circuit 60 also performs noise determination on the sensing data and position determination (coordinate calculation) on the object to be detected based on the sensing data. The noise determination is processing performed to determine the amount of noise components in the sensing data. The coordinate calculation is arithmetic processing performed to determine the position of the object to be detected in proximity to the sensor circuit 40. Specifically, the coordinate calculation can derive the position in the first direction Dx, the position in the second direction Dy, and the position in the third direction Dz (refer to FIG. 1) of the object to be detected in proximity to the sensor circuit 40, for example. Detailed explanation of the noise determination and the coordinate calculation is omitted herein because they are the same as those well-known.

Signals between the control circuit 60 and the processing unit 110 according to the present disclosure are transmitted by USB, which is a serial interface. Specifically, the signals between the control circuit 60 and the processing unit 110 are transmitted via signal lines D+ and D− of a USB cable. The serial interface for transmitting the signals between the control circuit 60 and the processing unit 110 is not limited to USB.

In the configuration described above, the second voltage conversion circuit 13, the AFE circuit 15, and the sensor circuit 40 included in the detection block 10 are electrically isolated from other components coupled thereto via the isolation type DC-DC converter 12, the first isolator 51, and the second isolator 52.

The first reference potential GND1 is supplied as the ground potential to the processing unit 110 side of the isolation type DC-DC converter 12, the control circuit 60 side of the first isolator 51, and the reference potential generation circuit 20 side of the second isolator 52. The first reference potential GND1 is a fixed potential held by a large electrode, such as a solid electrode.

By contrast, the second reference potential GND2 is supplied as the ground potential to the detection block 10 side of the isolation type DC-DC converter 12, the detection block 10 side of the first isolator 51, and the detection block 10 side of the second isolator 52. The second reference potential GND2 is a periodically fluctuating potential generated by the reference potential generation circuit 20.

The fluctuation period of the periodically fluctuating potential (second reference potential GND2) is the same as the square wave generation period of the drive signal (square wave period of the square wave signal Tx) generated by the AFE circuit 15. In other words, the periodically fluctuating potential (second reference potential GND2) is a potential that fluctuates periodically in synchronization with the drive signal (square wave signal Tx) generated by the AFE circuit 15.

Next, the reference potential generation circuit 20 is described.

The reference potential generation circuit 20 includes a low-pass filter (LPF) 23 and an amplifier circuit (AMP) 24.

The low-pass filter 23 suppresses high-frequency components of the square wave signal output from the AFE circuit 15 via the second isolator 52.

By suppressing the high-frequency components of the square wave signal by the low-pass filter 23, the amplifier circuit 24 in the subsequent stage is prevented from amplifying unnecessary noise components and increasing radiation noise. In FIG. 5, the waveform of the substantially square-wave-shaped output signal output from the low-pass filter 23 is schematically illustrated as a waveform SB3.

The amplifier circuit 24 is an inverting amplifier circuit that inverts and amplifies and impedance-converts the substantially square-wave-shaped output signal output from the low-pass filter 23. The signal inverted and amplified by the amplifier circuit 24 is supplied as the second reference potential GND2, which is the ground potential of the circuits in the detection block 10. The second reference potential GND2 is supplied to peripheral electrodes 411 and 412 and the shield electrode 44 of the sensor circuit 40. The amplifier circuit 24 may or may not perform polarity inversion depending on the polarity of the signal input to the amplifier circuit 24.

In the block configuration illustrated in FIG. 5, the sensor circuit 40 includes a plurality of sensor electrodes 421, . . . , and 42n (n is a natural number), the peripheral electrodes 411 and 412, the substrate 43, and the shield electrode 44. The peripheral electrodes 411 and 412 and the sensor electrodes 421, . . . , and 42n are electrodes adjacently disposed on the substrate 43. The shield electrode 44 is a film- or plate-like electrode facing the sensor electrodes 421, . . . , and 42n with the substrate 43 interposed therebetween. The peripheral electrodes 411 and 412 and the shield electrode 44 function as an active shield the potential of which fluctuates periodically depending on changes in the second reference potential GND2 supplied from the reference potential generation circuit 20.

As illustrated in FIG. 5, the AFE circuit 15 is coupled to the sensor electrodes 421, . . . , and 42n. The self-capacitance of the sensor electrodes 421, . . . , and 42n causes the sensor electrodes 421, . . . , and 42n, respectively, to output an electrical signal to the AFE circuit 15. Therefore, the AFE circuit 15 can acquire the electrical signals generated and output corresponding to the self-capacitance of the sensor electrodes 421, . . . , and 42n as detection signals Rx indicating the state of the sensor circuit 40. The region provided with the sensor electrodes 421, . . . , and 42n functions as the detection region SA (refer to FIG. 1). The sensor electrodes 421, . . . , and 42n in the detection region SA function as the detection electrodes in hover detection. The peripheral electrodes 411 and 412 disposed around the detection region SA function as the shield electrodes in hover detection.

Figure 6:
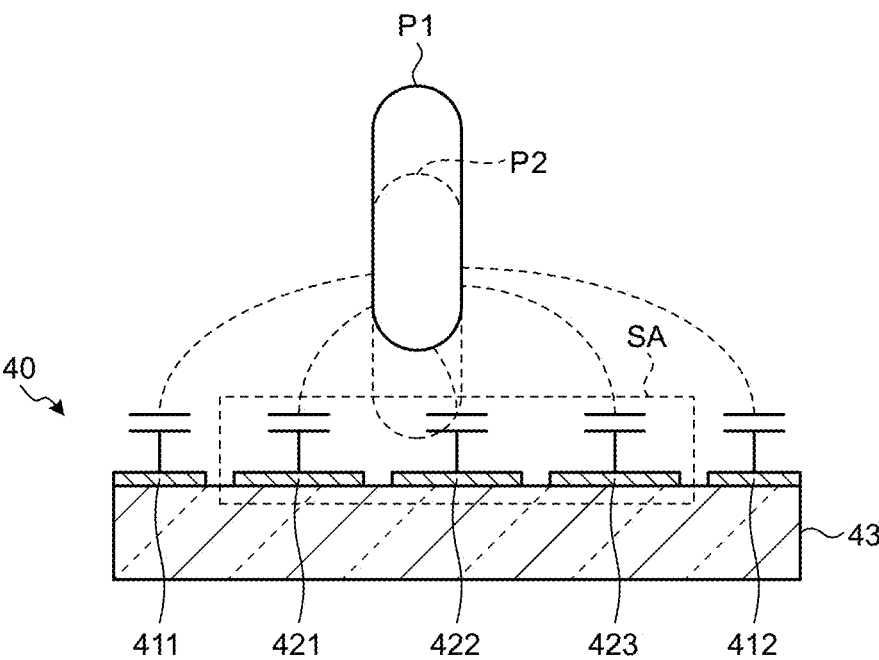
FIG. 6 is a schematic of a flow of electricity in an electric field generated from peripheral electrodes and sensor electrodes when a proximity object in proximity to the sensor circuit is at a position P1.
Figure 7:
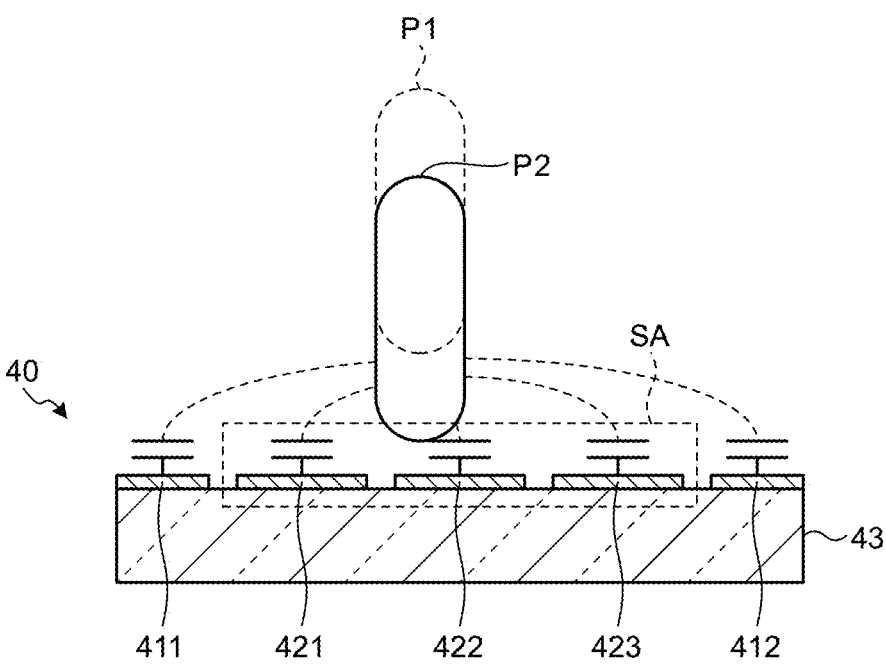
FIG. 7 is a schematic of a flow of electricity in the electric field generated from the peripheral electrodes and the sensor electrodes when the proximity object in proximity to the sensor circuit is at a position P2.

FIG. 6 is a schematic of a flow of electricity in an electric field generated from the peripheral electrodes 41 and the sensor electrodes 42 when a proximity object in proximity to the sensor circuit 40 is at a position P1. FIG. 7 is a schematic of a flow of electricity in an electric field generated from the peripheral electrodes 41 and the sensor electrodes 42 when the proximity object in proximity to the sensor circuit 40 is at a position P2. The intensity of the detection signals obtained from the sensor electrodes 421, 422, and 423 varies depending on whether the proximity object in proximity to the sensor circuit 40 is at the position P1 or the position P2.

Figure 8:
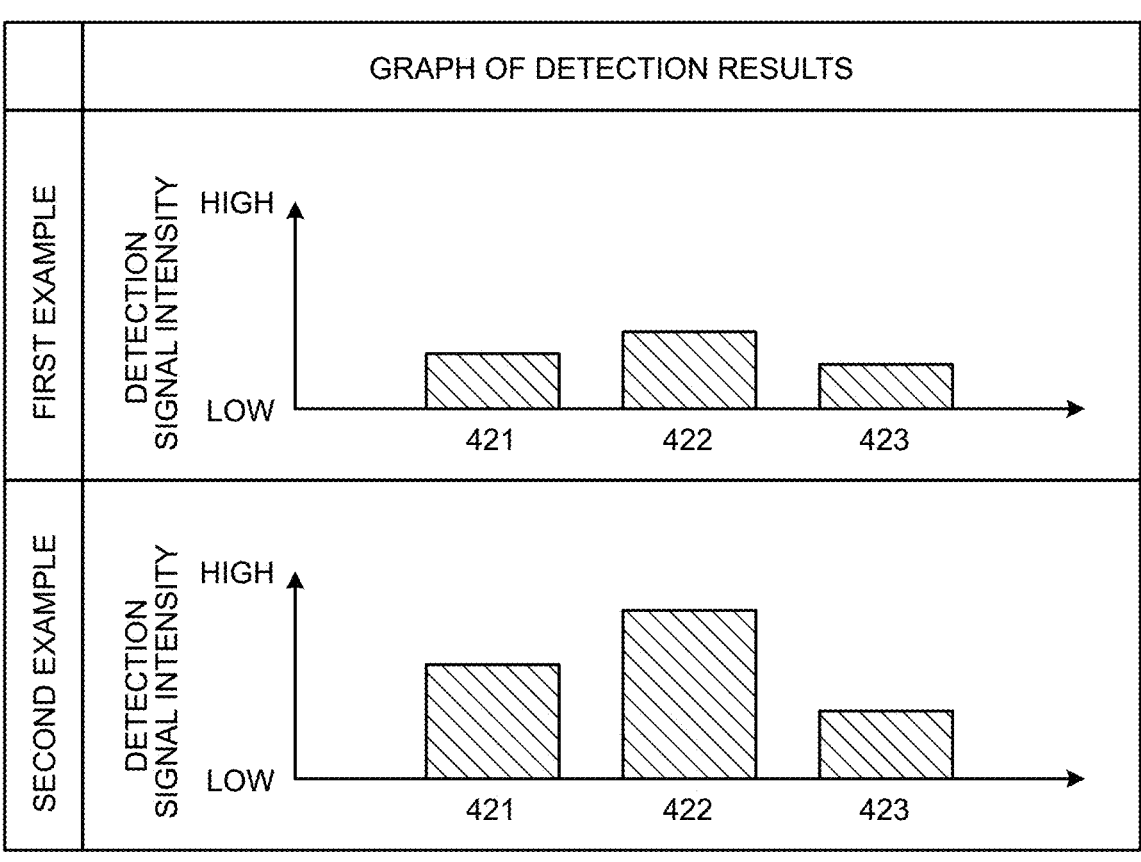
FIG. 8 is a schematic graph of examples of the intensity of detection signals obtained from the sensor electrodes.

FIG. 8 is a schematic graph of examples of the intensity of the detection signals obtained from the sensor electrodes 421, 422, and 423. The first example illustrated in FIG. 8 is the graph indicating the intensity of the detection signals obtained from the sensor electrodes 421, 422, and 423 when the object to be detected is at the position P1. The second example illustrated in FIG. 8 is the graph indicating the intensity of the detection signals obtained from the sensor electrodes 421, 422, and 423 when the object to be detected is at the position P2.

The AFE circuit 15 detects the degree of proximity of the object to be detected with respect to the sensor circuit 40 based on the relation between the intensity of the detection signals obtained from the sensor electrodes 421, . . . , and 42n (e.g., the sensor electrodes 421, 422, and 423) and the amplitude supplied to the peripheral electrodes 411 and 412 at the timing when the detection signals indicating the detection signal intensity are obtained. Thus, the degree of proximity of the object to be detected with respect to the sensor circuit 40 can be detected in hover detection.

In the present disclosure, the second reference potential GND2 is supplied as the ground potential of the AFE circuit 15 as described above. Therefore, the AFE circuit 15 can obtain information on the potential of the peripheral electrodes 411 and 412 at the timing of acquiring the detection signals from the sensor electrodes 421, . . . , and 42n based on the input to the second reference potential GND2. Thus, the AFE circuit 15 can detect whether the object to be detected enters the electric field generated between the peripheral electrodes 411 and 412 and the sensor electrodes 421, . . . , and 42n.

Figure 9:
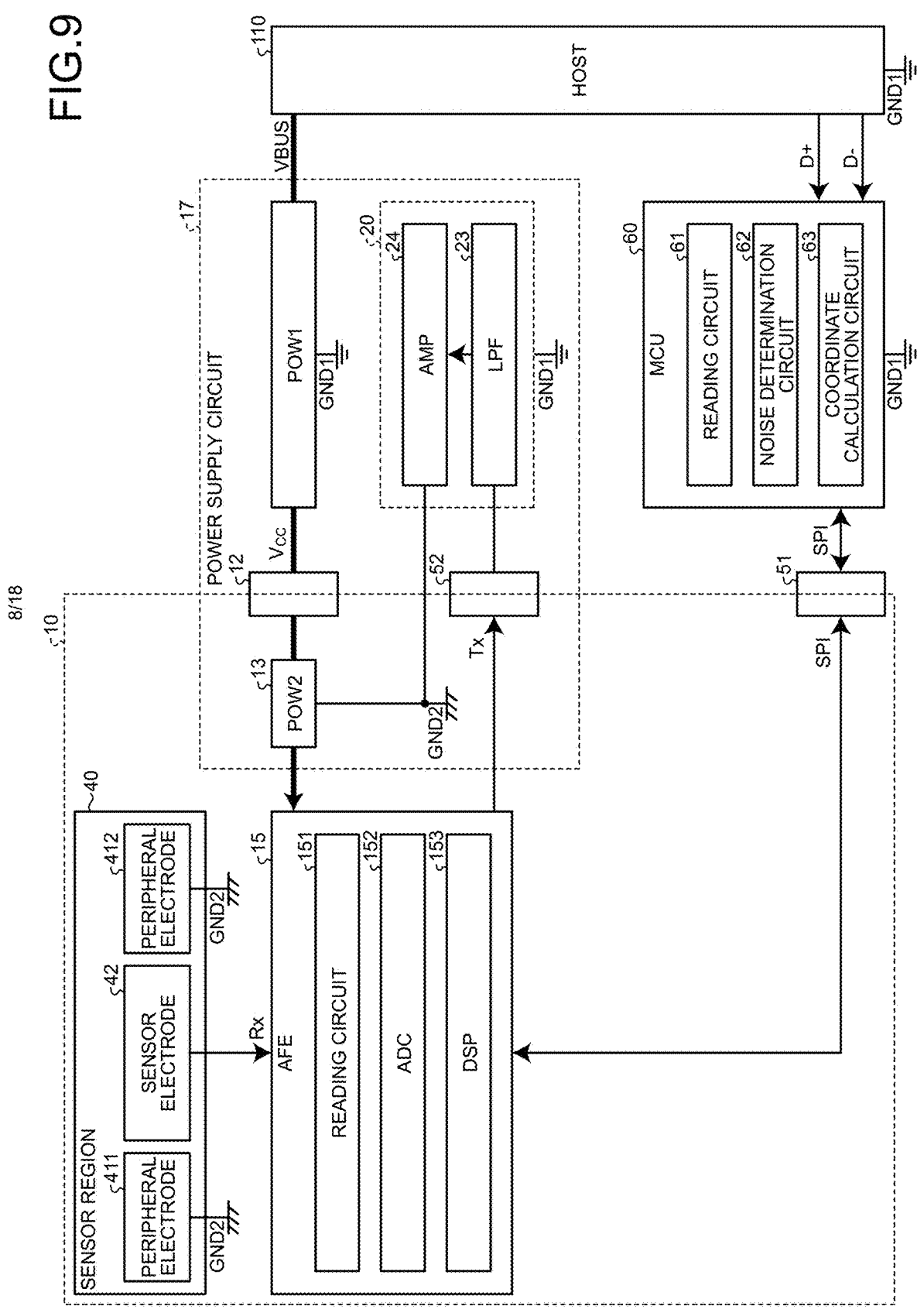
FIG. 9 is a diagram of a functional circuit block configuration of the detecting device according to the embodiment.

FIG. 9 is a diagram of a functional circuit block configuration of the detecting device according to the embodiment.

As illustrated in FIG. 9, the AFE circuit 15 includes a reading circuit 151, an analog digital converter (ADC) circuit 152, and a digital signal processor (DSP) circuit 153. Each circuit element of the AFE circuit 15 operates with the second reference potential GND2, which is a periodically fluctuating potential generated by the reference potential generation circuit 20, as the ground potential.

The reading circuit 151 acquires the detection signals Rx from the sensor electrodes 421, . . . , and 42n.

The ADC circuit 152 converts the detection signals Rx acquired by the reading circuit 151 from analog signals into digital signals.

The DSP circuit 153 performs digital filtering on digital data resulting from conversion into the digital signals by the ADC circuit 152 to generate sensing data based on the detection signals Rx.

The AFE circuit 15 outputs the sensing data generated by the DSP circuit 153 to the control circuit 60 via the first isolator 51.

The control circuit 60 includes a reading circuit 61, a noise determination circuit 62, and a coordinate calculation circuit 63. Each circuit element of the control circuit 60 operates with the first reference potential GND1, which is a fixed potential, as the ground potential.

The reading circuit 61 acquires the sensing data output from the AFE circuit 15 via the first isolator 51.

The noise determination circuit 62 performs the noise determination described above based on the sensing data acquired by the reading circuit 61.

The coordinate calculation circuit 63 performs the coordinate calculation described above based on the sensing data acquired by the reading circuit 61.

The control circuit 60 according to the present disclosure has a function of changing the fundamental frequency of the square wave signal Tx output from the AFE circuit 15. The control circuit 60 according to the present disclosure can change the drive frequency in self-capacitance hover detection, that is, the fundamental frequency of the square wave signal Tx output from the AFE circuit 15. Therefore, the effects of noise can be reduced. The change in the fundamental frequency of the square wave signal Tx is hereinafter also referred to as "frequency hopping".

Figure 10:
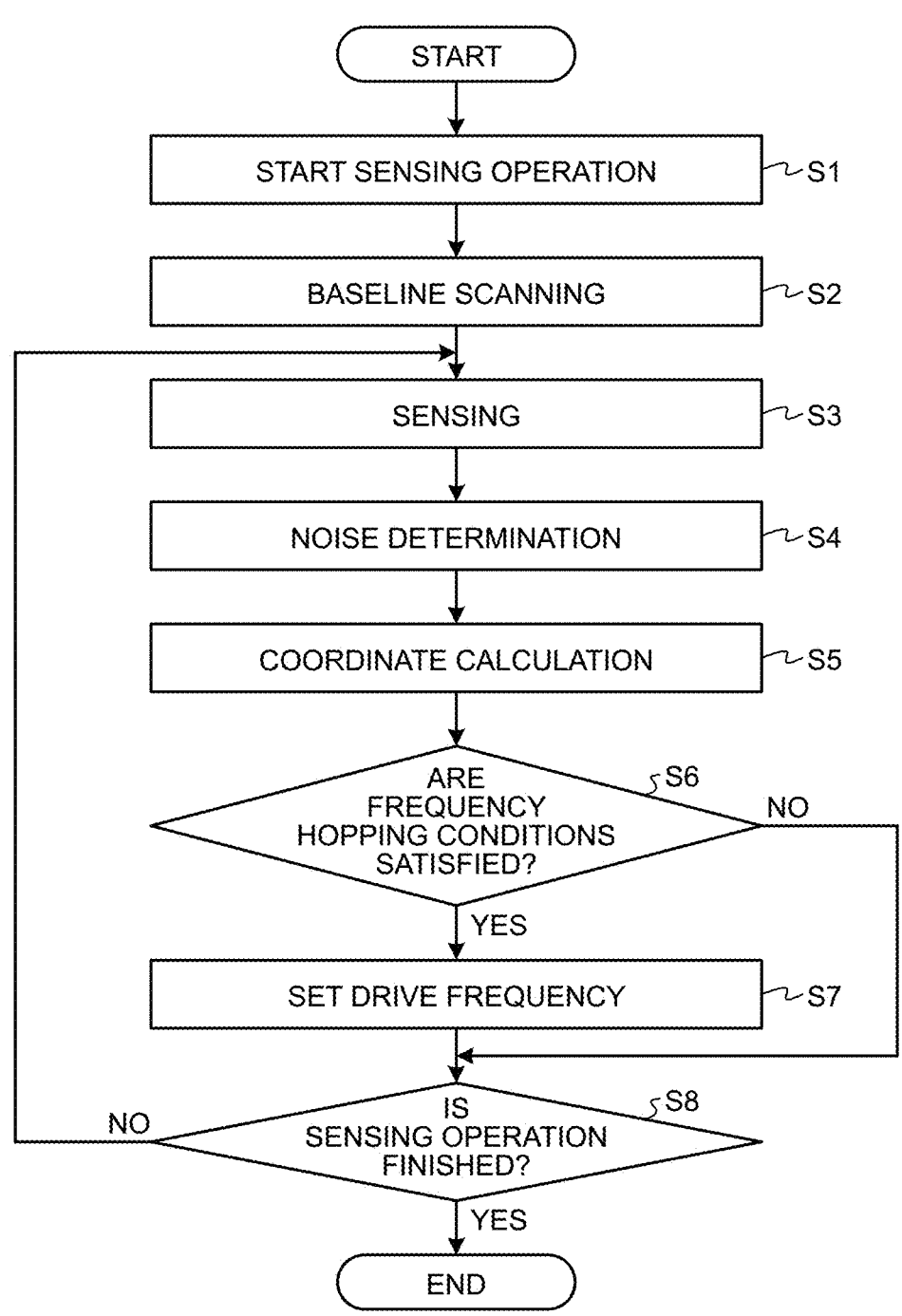
FIG. 10 is a flowchart of an example of a hover detection operation in the detecting device.

FIG. 10 is a flowchart of an example of the hover detection operation in the detecting device 1. When electric power is supplied from the power supply circuit 17, and the detecting device 1 starts a sensing operation (Step S1), the detecting device 1 performs baseline scanning to acquire the detection signals Rx when no object to be detected is in proximity to the sensor circuit 40 (Step S2).

After the baseline scanning is performed, the detecting device 1 performs a normal hover detection operation (sensing) (Step S3). The control circuit 60 performs the noise determination and the coordinate calculation described above based on the difference between the detection signals Rx acquired by the baseline scanning (Step S2) and the detection signals Rx acquired by the sensing (Step S3). More specifically, the noise determination circuit 62 performs the noise determination (Step S4) based on the difference between the detection signals Rx acquired by the baseline scanning (Step S2) and the detection signals Rx acquired by the sensing (Step S3).

The coordinate calculation circuit 63 performs the coordinate calculation (Step S5) based on the difference between the detection signals Rx acquired by the baseline scanning (Step S2) and the detection signals Rx acquired by the sensing (Step S3).

While the coordinate calculation (Step S5) is performed after the noise determination (Step S4) in FIG. 10, the noise determination (Step S4) may be performed after the coordinate calculation (Step S5), or the noise determination (Step S4) and the coordinate calculation (Step S5) may be performed in parallel.

Subsequently, the control circuit 60 determines whether the conditions for performing the frequency hopping described above (hereinafter also referred to simply as "frequency hopping conditions") are satisfied (Step S6). Specifically, the control circuit 60 determines whether it has received signals including a frequency hopping command that instructs the detecting device 1 to perform frequency hopping from the processing unit 110 coupled via the FPC 255 illustrated in FIG. 13.

The frequency hopping conditions are not limited to that described above. For example, the frequency hopping conditions may be determined to be satisfied when the processing unit 110 acquires the drive frequency of the detecting device 1 and the drive frequency of a touch panel 210, and both are the same. Alternatively, the frequency hopping conditions may be determined to be satisfied when the control circuit 60 of the detecting device 1 acquires the drive frequency of the touch panel 210, and the drive frequency of the touch panel 210 is the same as the frequency of the square wave signal Tx. Still alternatively, the control circuit 60 may determine whether the frequency hopping conditions are satisfied.

If the frequency hopping conditions are not satisfied (No at Step S6), the detecting device 1 performs the processing at Step S8.

If the frequency hopping conditions are satisfied (Yes at Step S6), the control circuit 60 sets the drive frequency in hover detection, that is, the fundamental frequency of the square wave signal Tx output from the AFE circuit 15 to the frequency after frequency hopping (Step S7).

If the frequency hopping conditions are not satisfied at Step S6 (No at Step S6) or after the drive frequency is changed at Step S7, the detecting device 1 determines whether the sensing operation is finished (Step S8). If the sensing operation is finished (Yes at Step S8), the hover detection operation is terminated. Examples of the case where the sensing operation is finished include, but are not limited to, when no electric power is supplied from the power supply circuit 17, when a command to finish the sensing operation is output from the processing unit 110 to the detecting device 1, etc. If the sensing operation of the detecting device 1 is not finished (No at Step S8), the detecting device 1 performs the processing from Step S3 again.

Figure 11:
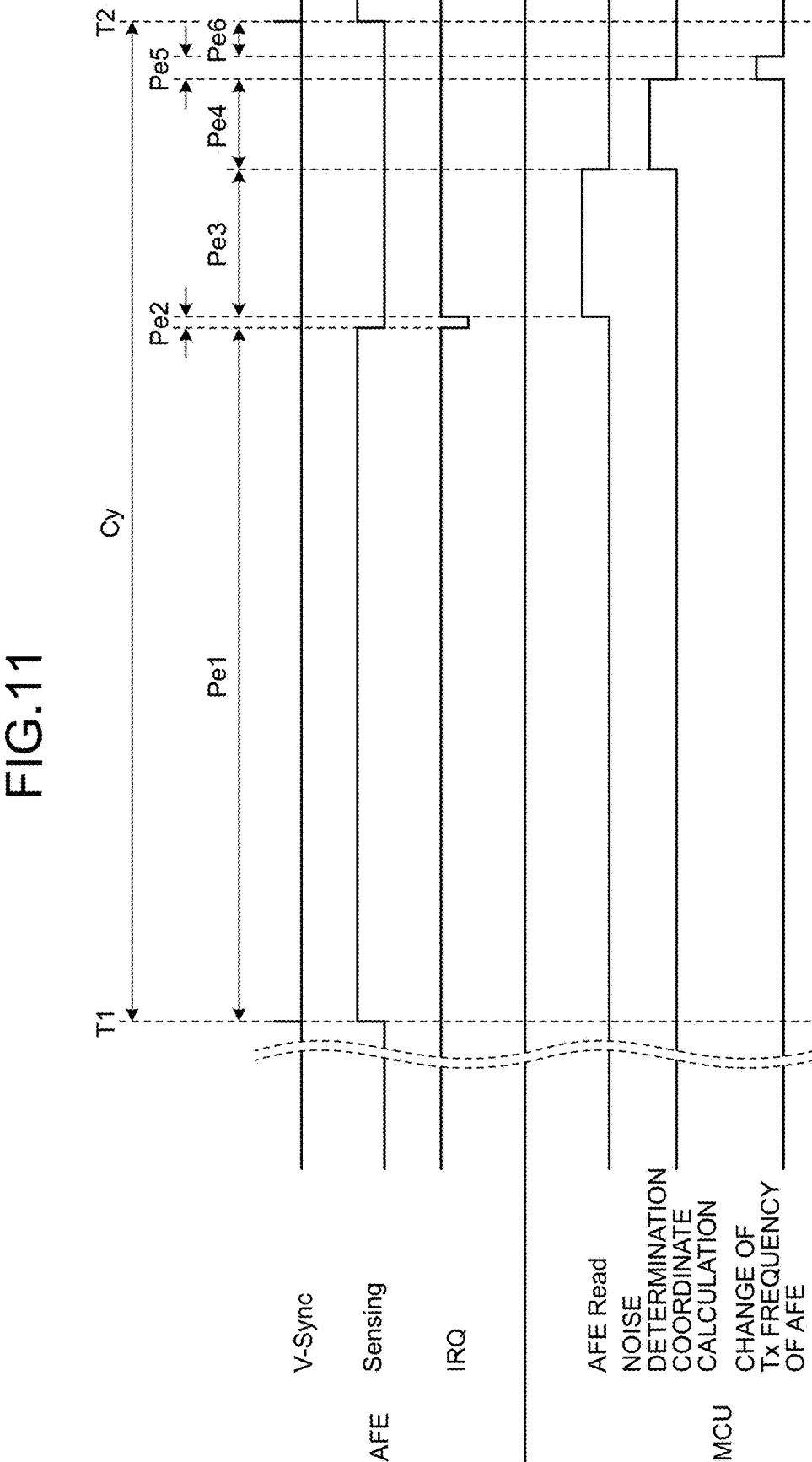
FIG. 11 is a timing chart of an example of the operation flow of the detecting device that can perform frequency hopping.

FIG. 11 is a timing chart of an example of the operation flow of the detecting device 1 that can perform frequency hopping. The processing flow of the hover detection operation in the detecting device 1 is defined in units of a repetition period Cy. First, a clock signal (V-Sync) indicating the start of the repetition period Cy is output at a predetermined period. In FIG. 11, the clock signal is output at timings T1 and T2. The following describes the operation flow in the repetition period Cy starting at the timing T1.

Starting from the timing T1, the sensing operation (sensing) corresponding to Step S3 described above is performed. The sensing operation is performed in a period Pe1 from the timing T1 to the start of a period Pe2 in which an interrupt signal (IRQ) indicating the end of the sensing operation is generated.

From the end of the period Pe2 to the timing T2, periods Pe3, Pe4, Pe5, and Pe6 sequentially occur.

The period Pe3 is a period in which the sensing data output from the AFE circuit 15 via the first isolator 51 is read (AFE Read).

The period Pe4 is a period in which the noise determination corresponding to Step S4 and the coordinate calculation corresponding to Step S5 described above are performed in parallel.

The period Pe5 is a period in which a command is output (information is written) to the AFE circuit 15 to set the fundamental frequency of the square wave signal Tx to the frequency after frequency hopping when frequency hopping is performed.

The period Pe6 is a blank period from the end of the period Pe5 to the timing T2.

Starting from the timing T2, the periods Pe1, ..., and Pe6 described above are repeated again. Thereafter, the periods Pe1, ..., and Pe6 described above are repeated again each time the clock signal (V-Sync) indicating the start of the repetition period Cy is output at the predetermined period.

As described above, the electric power supplied via the first voltage conversion circuit 11 according to the present disclosure is converted into the second power supply potential that fluctuates in synchronization with the second reference potential GND2.

In the configuration according to the embodiment, the isolation type DC-DC converter 12 is provided on the power supply path between the first voltage conversion circuit 11 and the second voltage conversion circuit 13 as illustrated in FIG. 5. The isolation type DC-DC converter 12 generates the second power supply potential that is substantially constant with respect to the second reference potential GND2 that fluctuates periodically based on the first power supply potential that is substantially constant with respect to the first reference potential GND1 as the ground potential. The AFE circuit 15 operates by being supplied with the power supply potential $V_{DD}$ converted by the second voltage conversion circuit 13 based on the second power supply potential supplied from the isolation type DC-DC converter 12. Isolation type DC-DC converters used in such a configuration according to the embodiment are generally poor in variety and expensive and tend to have a large package size. The following describes a configuration that can be manufactured at a lower cost and in a smaller size than the configuration according to the embodiment.

First Embodiment

Figure 12:
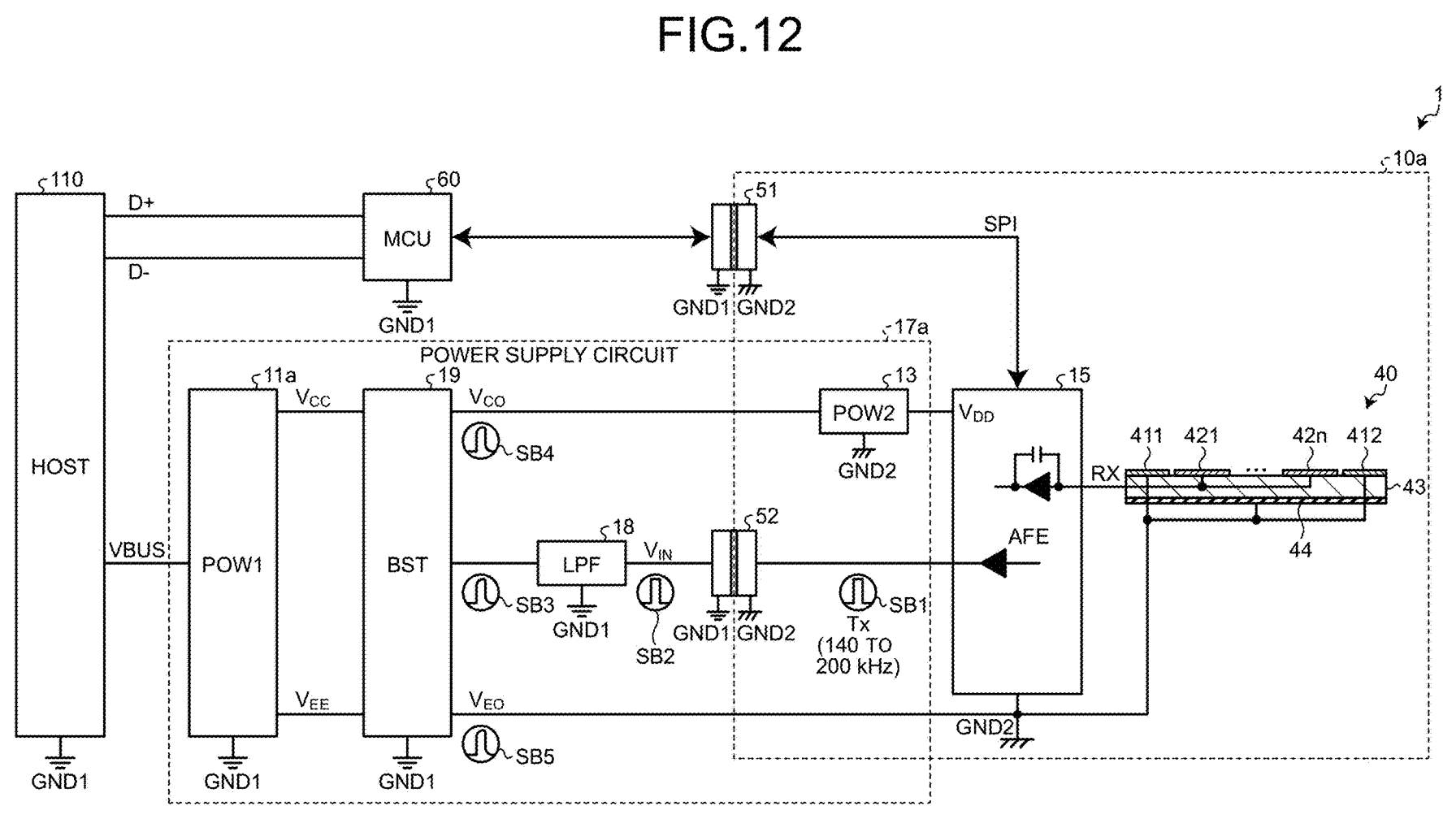
Figure 13:
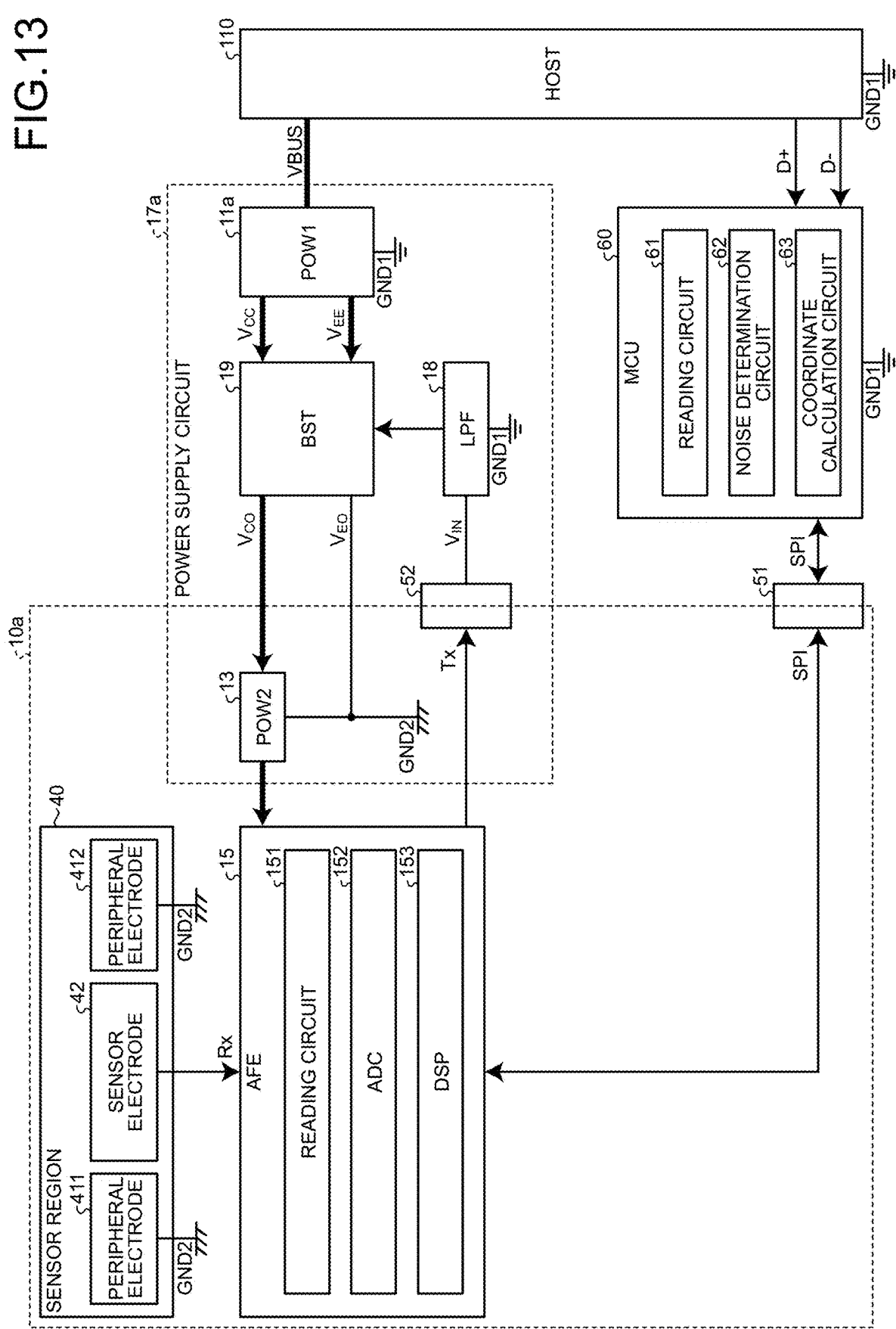
FIG. 13 is a diagram of an exemplary functional circuit block configuration of the detecting device according to the first embodiment.
Figure 14:
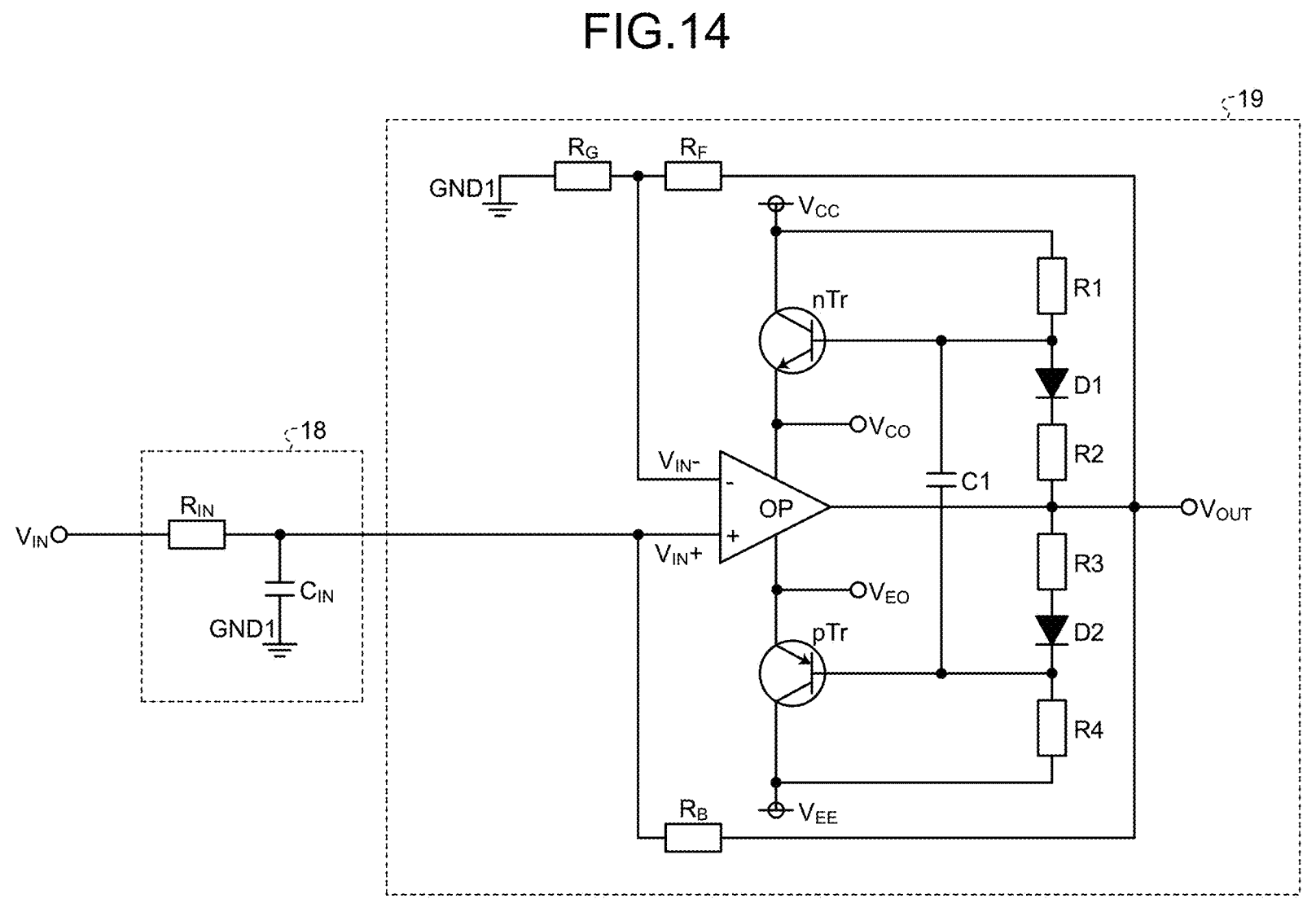
Figure 15:
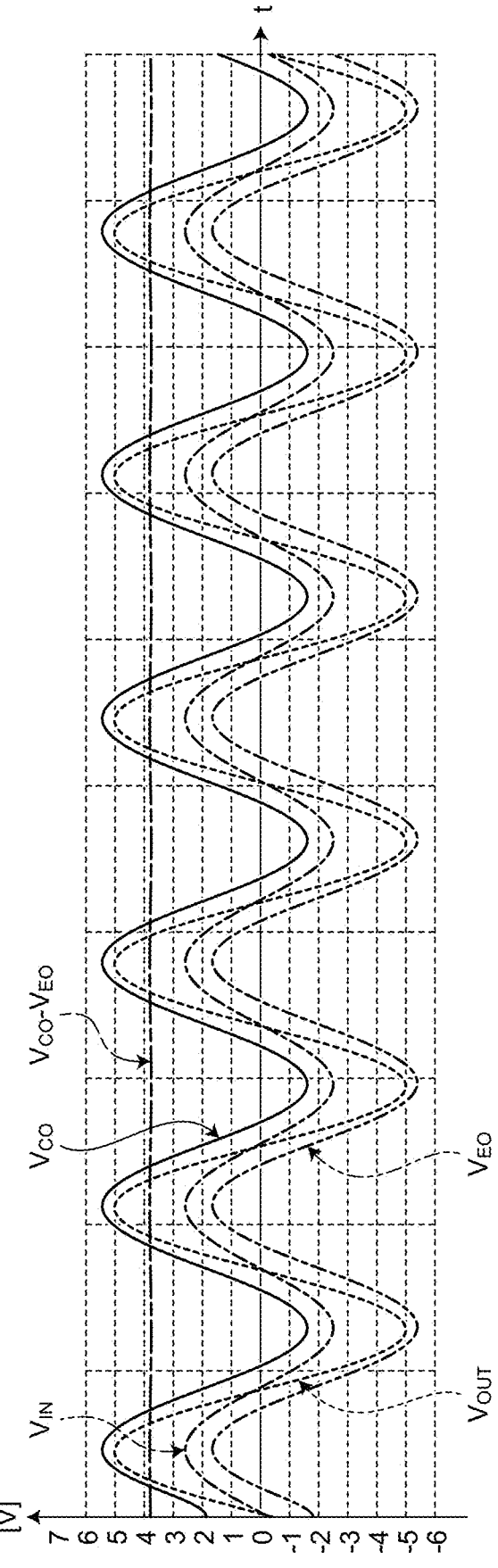
FIG. 15 is a diagram of an exemplary operation of the power supply circuit according to the first embodiment.

The following describes the configuration according to a first embodiment with reference to FIGS. 12, 13, 14, and 15. FIG. 12 is a diagram of an exemplary block configuration of the detecting device 1 according to the first embodiment. FIG. 13 is a diagram of a functional circuit block configuration of the detecting device 1 according to the first embodiment. FIG. 14 is a block diagram of an exemplary main configuration of the power supply circuit according to the first embodiment. FIG. 15 is a diagram of an exemplary operation of the power supply circuit according to the first embodiment. The same components as those according to the embodiment illustrated in FIGS. 5 and 9 are denoted by like reference numerals, and detailed explanation thereof may be omitted.

In the configuration according to the first embodiment, a power supply circuit 17a includes a first voltage conversion circuit (POW1) 11a, the second voltage conversion circuit (POW2) 13, a low-pass filter (LPF) 18, and an amplifier circuit 19.

The first voltage conversion circuit 11a operates with the first reference potential GND1 as the ground potential. The first voltage conversion circuit 11a converts the potential of the electric power supplied from the processing unit 110 via the power supply line VBUS of the USB cable, for example, into a first positive power supply potential $V_{CC}$ and a first negative power supply potential $V_{EE}$ that are substantially constant with respect to the first reference potential GND1 as the ground potential.

The second voltage conversion circuit 13 operates with the second reference potential GND2 as the ground potential. The second voltage conversion circuit 13 converts the electric power supplied from the amplifier circuit 19 into the power supply potential $V_{DD}$ of the AFE circuit 15. The power supply potential $V_{DD}$ includes an analog power supply potential of the AFE circuit 15 and an input/output power supply potential of the AFE circuit 15, for example.

The low-pass filter 18 suppresses high-frequency components of the square wave signal output from the AFE circuit 15 via the second isolator 52. In FIG. 14, the low-pass filter 18 is composed of a first order RC circuit (an input resistor $R_{IN}$ and a capacitor $C_{IN}$), for example, and the input potential of the low-pass filter 18 is $V_{IN}$.

The low-pass filter 18 has a configuration substantially identical to that of the low-pass filter (LPF) 23 of the reference potential generation circuit 20 in the configuration according to the embodiment. By suppressing the high-frequency components of the square wave signal by the low-pass filter 18, the amplifier circuit 19 in the subsequent stage is prevented from amplifying unnecessary noise components and increasing radiation noise. In FIG. 12, the waveform of the substantially square-wave-shaped output signal output from the low-pass filter 18 is schematically illustrated as the waveform SB3.

The amplifier circuit 19 is a non-inverting amplifier circuit including an operational amplifier OP. The amplifier circuit 19 includes a positive feedback resistor $R_B$ coupled between the non-inverting input terminal and the output terminal of the operational amplifier OP, a negative feedback resistor $R_F$ coupled between the inverting input terminal and the output terminal of the operational amplifier OP, and a ground resistor $R_G$ coupled between the inverting input terminal of the operational amplifier OP and the first reference potential GND1. If polarity inversion needs to be performed, an inverter circuit or an EXOR gate circuit may be inserted in a stage preceding the low-pass filter 18, for example.

In the configuration according to the first embodiment, the amplifier circuit 19 employs a bootstrap circuit composed of a push-pull emitter follower circuit as a power supply for the operational amplifier OP as illustrated in FIG. 14.

More specifically, an output potential $V_{CO}$ of an NPN emitter follower transistor nTr driven by the voltage division potential between the first positive power supply potential $V_{CC}$ and an output potential $V_{OUT}$ of the operational amplifier OP is supplied as the positive power supply potential of the operational amplifier OP. The base potential of the NPN emitter follower transistor nTr is biased by the voltage division ratio between a resistor R1, a diode D1, and a resistor R2.

The output potential $V_{CO}$ of the NPN emitter follower transistor nTr is expressed by the following Expression (1) when the voltage drop due to the diode D1 and the base-to-emitter voltage (VBE) of the NPN emitter follower transistor nTr are 0.6 V. In other words, the output potential $V_{CO}$ of the NPN emitter follower transistor nTr is substantially equal to the cathode voltage of the diode D1.

$$V_{CO} = \frac{(V_{CC} - 0.6)R2 + V_{OUT}R1}{R1 + R2} \tag{1}$$

The output potential $V_{CO}$ of the NPN emitter follower transistor nTr is output to the second voltage conversion circuit 13 as the second power supply potential. In FIG. 12, the waveform of the substantially square-wave-shaped second power supply potential (output potential $V_{CO}$) output from the amplifier circuit 19 is schematically illustrated as a waveform SB4.

An output potential $V_{EO}$ of a PNP emitter follower transistor pTr driven by the voltage division potential between the output potential $V_{OUT}$ of the operational amplifier OP and the first negative power supply potential $V_{EE}$ is supplied as the negative power supply potential of the operational amplifier OP. The base potential of the PNP emitter follower transistor pTr is biased by the voltage division ratio between a resistor R3, a diode D2, and a resistor R4.

The output potential $V_{EO}$ of the PNP emitter follower transistor pTr is expressed by the following Expression (2) when the voltage drop due to the diode D2 and the base-to-emitter voltage (VBE) of the PNP emitter follower transistor pTr are 0.6 V. In other words, the output potential $V_{CO}$ of the PNP emitter follower transistor pTr is substantially equal to the cathode voltage of the diode D2.

$$V_{EO} = \frac{(V_{EE} + 0.6)R3 + V_{OUT}R4}{R3 + R4} \tag{2}$$

The output potential $V_{EO}$ of the PNP emitter follower transistor pTr is output to a detection block 10$a$ as the second reference potential GND2. In FIG. 12, the waveform of the substantially square-wave-shaped second reference potential GND2 (output potential $V_{EO}$) output from the amplifier circuit 19 is schematically illustrated as a waveform SB5.

An amplification factor Gain of the operational amplifier OP is expressed by the following Expression (3) using the input resistor $R_{IN}$, the positive feedback resistor $R_B$, the negative feedback resistor $R_F$, and the ground resistor $R_G$.

$$\text{Gain} = \frac{V_{OUT}}{V_{IN}} = \frac{R_G R_B + R_F R_B}{R_G R_B - R_F R_{IN}} = \frac{1 + \dfrac{R_F}{R_G}}{1 - \dfrac{R_F}{R_G}\dfrac{R_{IN}}{R_B}} \tag{3}$$

The following describes the method for deriving Expression (3) above. An inverting input potential $V_{IN}-$ of the operational amplifier OP is expressed by the following Expression (4):

$$V_{IN-} = \frac{R_G}{R_G + R_F} V_{OUT} \tag{4}$$

In the following Expression (5), the left side indicates the current flowing through the input resistor $R_{IN}$, and the right side indicates the current flowing through the positive feedback resistor $R_B$. A non-inverting input potential $V_{IN}+$ of the operational amplifier OP is expressed by the following Expression (6) obtained by transforming the following Expression (5):

$$\frac{V_{OUT} - V_{IN+}}{R_B} = \frac{V_{IN+} - V_{IN}}{R_{IN}} \tag{5}$$

$$V_{IN+} = \frac{R_B V_{IN} + R_{IN} V_{OUT}}{R_B + R_{IN}} \tag{6}$$

The inverting input potential $V_{IN}-$ and the non-inverting input potential $V_{IN}+$ of the operational amplifier OP are virtual shorts, whereby the following Expression (7) is satisfied.

$$\frac{R_G}{R_G + R_F} V_{OUT} = \frac{R_B V_{IN} + R_{IN} V_{OUT}}{R_B + R_{IN}} \tag{7}$$

By transforming Expression (7) above, the amplification factor Gain of the operational amplifier OP expressed by Expression (3) above is obtained.

The operational amplifier OP is operated by the potential difference $V_{CO}-V_{EO}$ (hereinafter also referred to as "drive voltage") between the output potential of the NPN emitter follower transistor nTr (positive power supply potential) $V_{CO}$ and the output potential of the PNP emitter follower transistor pTr (negative power supply potential) $V_{EO}$. The drive voltage $V_{CO}-V_{EO}$ of the operational amplifier OP is expressed by the following Expression (8) when R1=R4 and R2=R3 are satisfied.

$$V_{CO} - V_{EO} = \frac{R2}{R1 + R2}(V_{CC} - V_{EE} - 1.2) \tag{8}$$

Considering the current flowing through the resistors R1, R2, R3, and R4 and the resistor size, it is preferable that R1 and R4 be approximately 2.7 k$\Omega$ and that R2 and R3 be approximately 1 k$\Omega$, for example.

FIG. 15 illustrates an operation when the input potential $V_{IN}$ of the low-pass filter 18 is a sinusoidal signal of 200 kHz and the amplitude of the sinusoidal signal is 3.3 V, for example. In FIG. 15, each resistance is adjusted such that the drive voltage $V_{CO}-V_{EO}$ of the operational amplifier OP is approximately 3.7 V, the load current is 37 mA, and the amplitude of the output potential $V_{OUT}$ is approximately 7 V.

As illustrated in FIG. 15, the output potential $V_{OUT}$ of the operational amplifier OP is lower than the positive power supply potential of the operational amplifier OP (output potential $V_{CO}$ of the NPN emitter follower transistor nTr) output to the second voltage conversion circuit 13 as the second power supply potential and is higher than the negative power supply potential of the operational amplifier OP (output potential $V_{EO}$ of the PNP emitter follower transistor pTr) output to the detection block 10$a$ as the second reference potential GND2. In other words, the positive power supply potential of the operational amplifier OP (output potential $V_{CO}$ of the NPN emitter follower transistor nTr) output to the second voltage conversion circuit 13 as the second power supply potential is higher than the output potential $V_{OUT}$ of the operational amplifier OP, and the negative power supply potential of the operational amplifier OP (output potential $V_{EO}$ of the PNP emitter follower transistor pTr) output to the detection block 10$a$ as the second reference potential GND2 is lower than the output potential $V_{OUT}$ of the operational amplifier OP.

The second power supply potential (output potential $V_{CO}$) output to the second voltage conversion circuit 13 is a potential obtained by superimposing the substantially constant drive voltage $V_{CO}-V_{EO}$ (approximately 3.7 V in FIG. 15) of the operational amplifier OP on the second reference potential GND2 (output potential $V_{EO}$) output to the detection block 10$a$. Therefore, similarly to the configuration according to the embodiment, the electric power supplied via the first voltage conversion circuit 11$a$ is converted into the power supply potential (second power supply potential $V_{CO}$) that fluctuates in synchronization with the second reference potential GND2 (output potential $V_{EO}$).

Instead of the isolation type DC-DC converter 12 in the configuration according to the embodiment, the configuration according to the first embodiment is provided with the amplifier circuit (BST) 19 composed of the general-purpose operational amplifier OP on the power supply path between the first voltage conversion circuit 11$a$ and the second voltage conversion circuit 13. The AFE circuit 15 is supplied with the second reference potential GND2 (output potential $V_{EO}$) from the amplifier circuit (BST) 19 and operates based on the second power supply potential $V_{CO}$ that is substantially constant with respect to the second reference potential GND2. Therefore, the detecting device 1 can be manufactured at a lower cost and in a smaller size than the configuration according to the embodiment.

Second Embodiment

Figure 16:
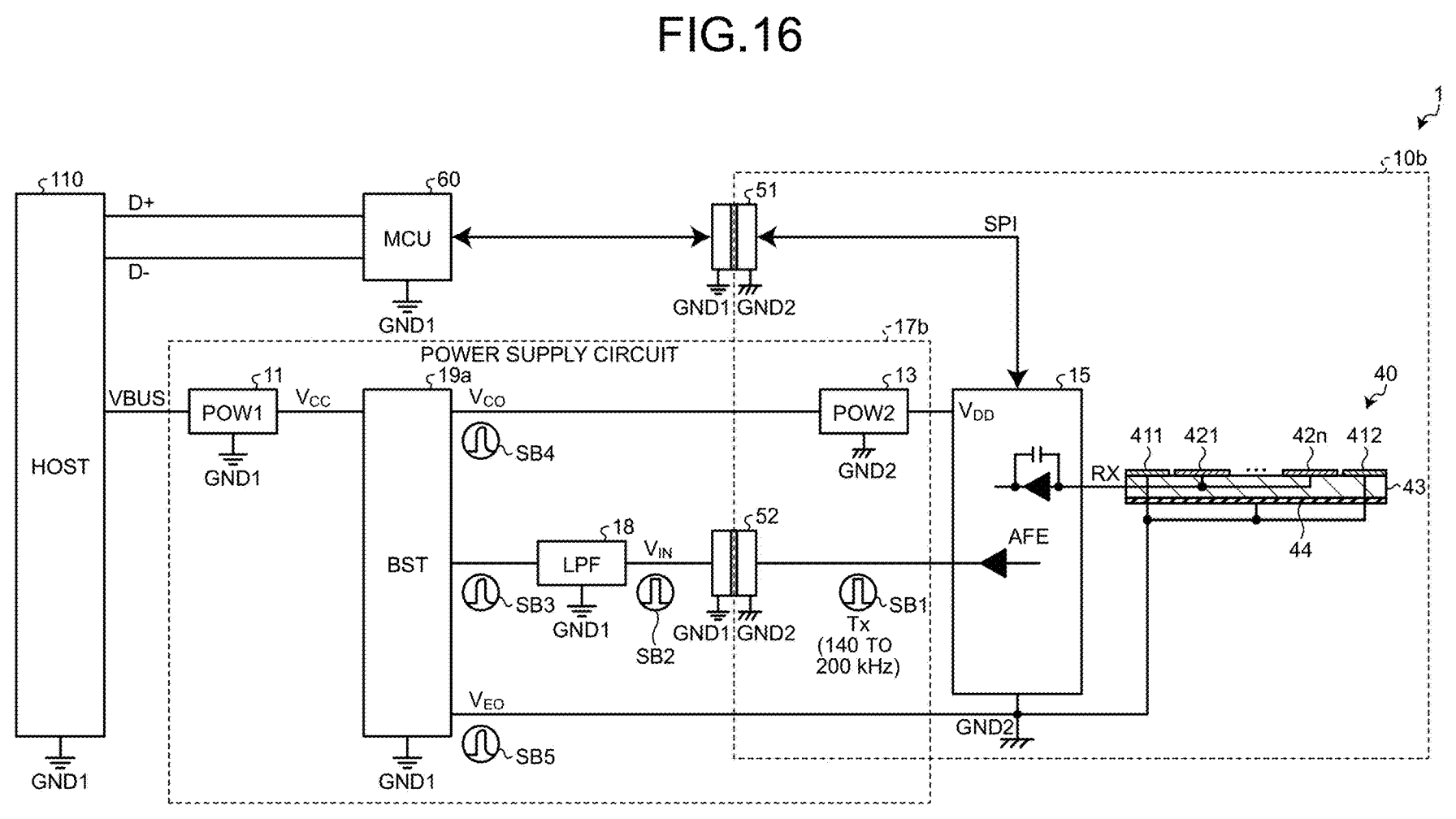
Figure 17:
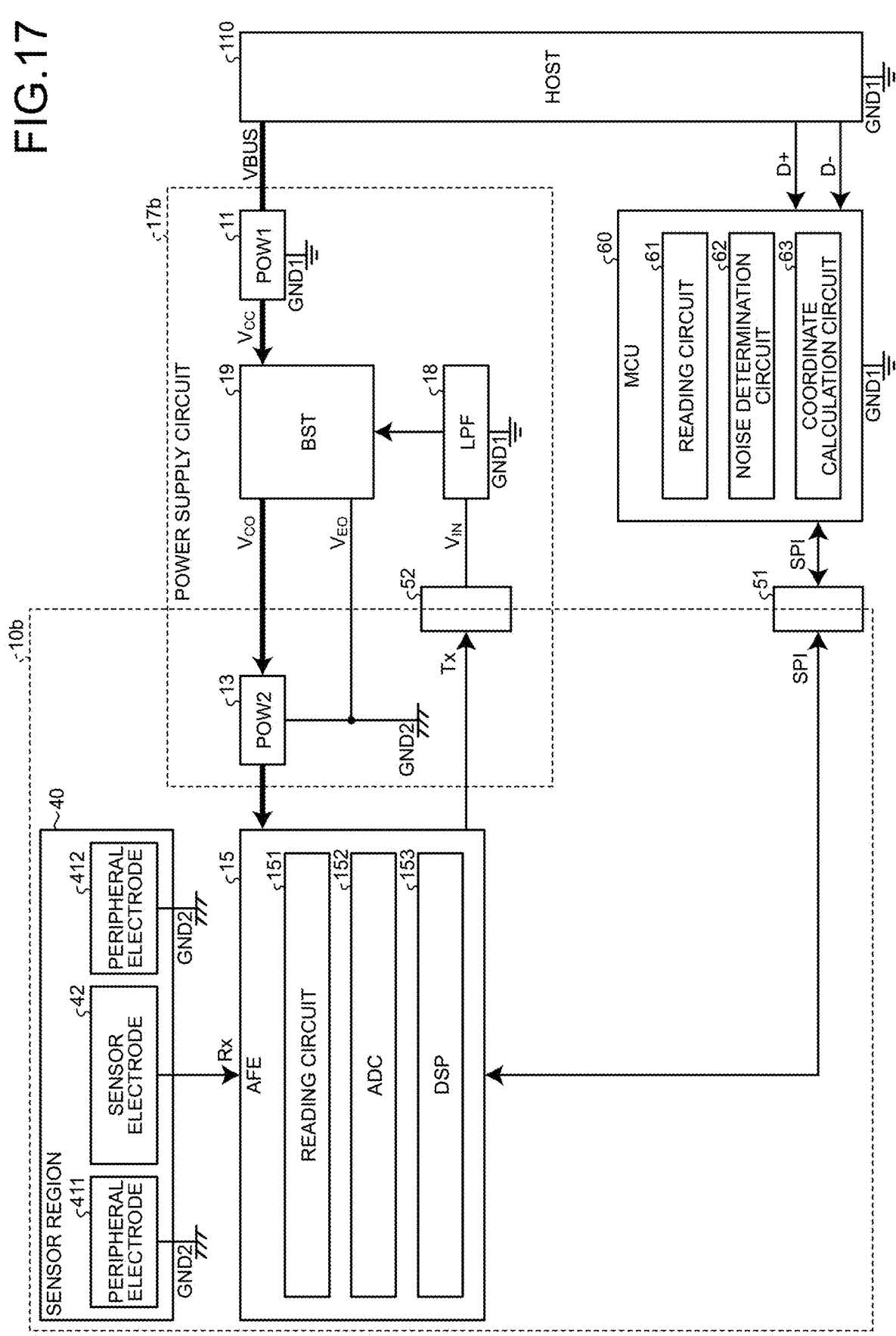
FIG. 17 is a diagram of an exemplary functional circuit block configuration of the detecting device according to the second embodiment.
Figure 18:
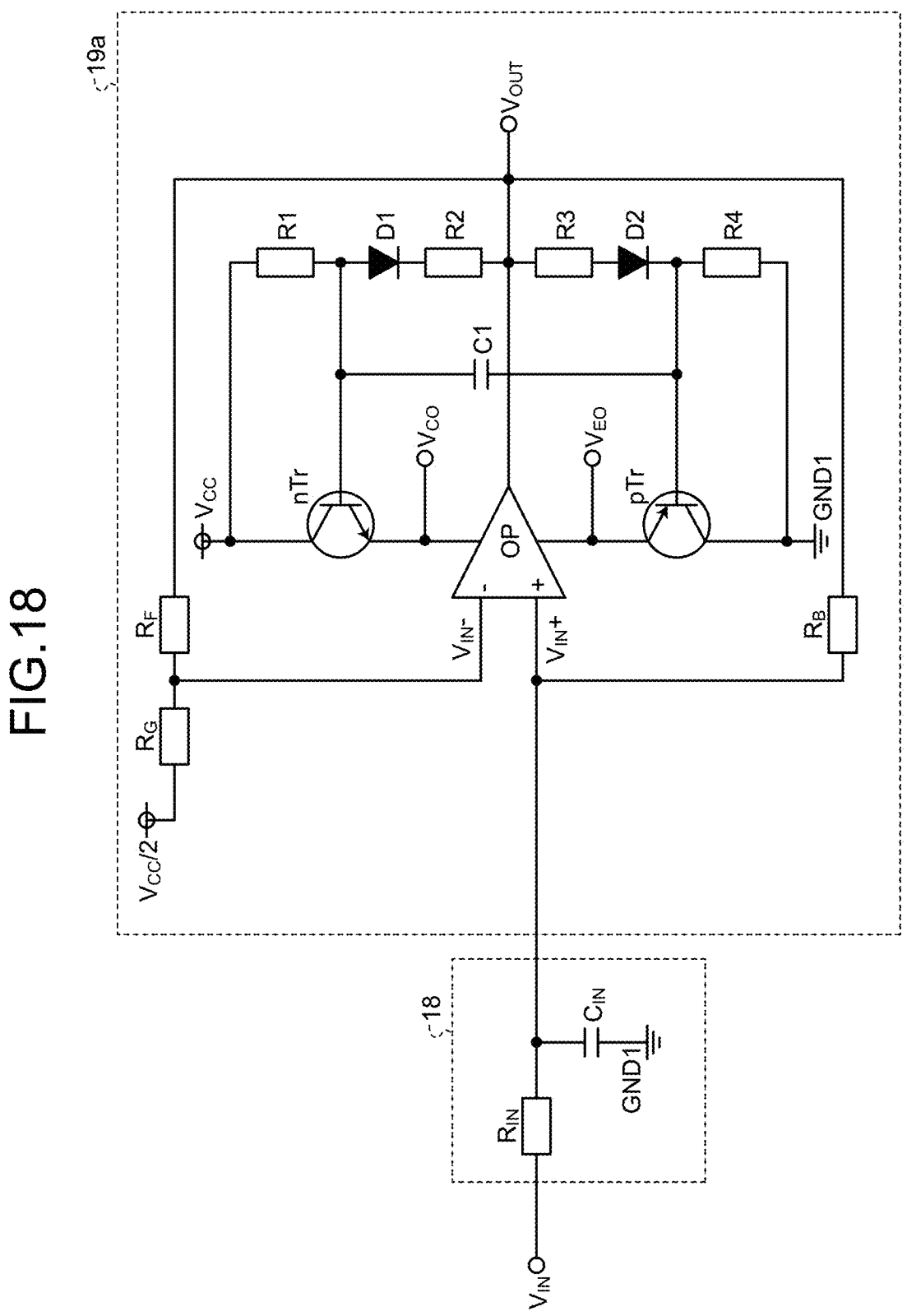
FIG. 18 is a block diagram of an exemplary main configuration of the power supply circuit according to the second embodiment.
Figure 19:
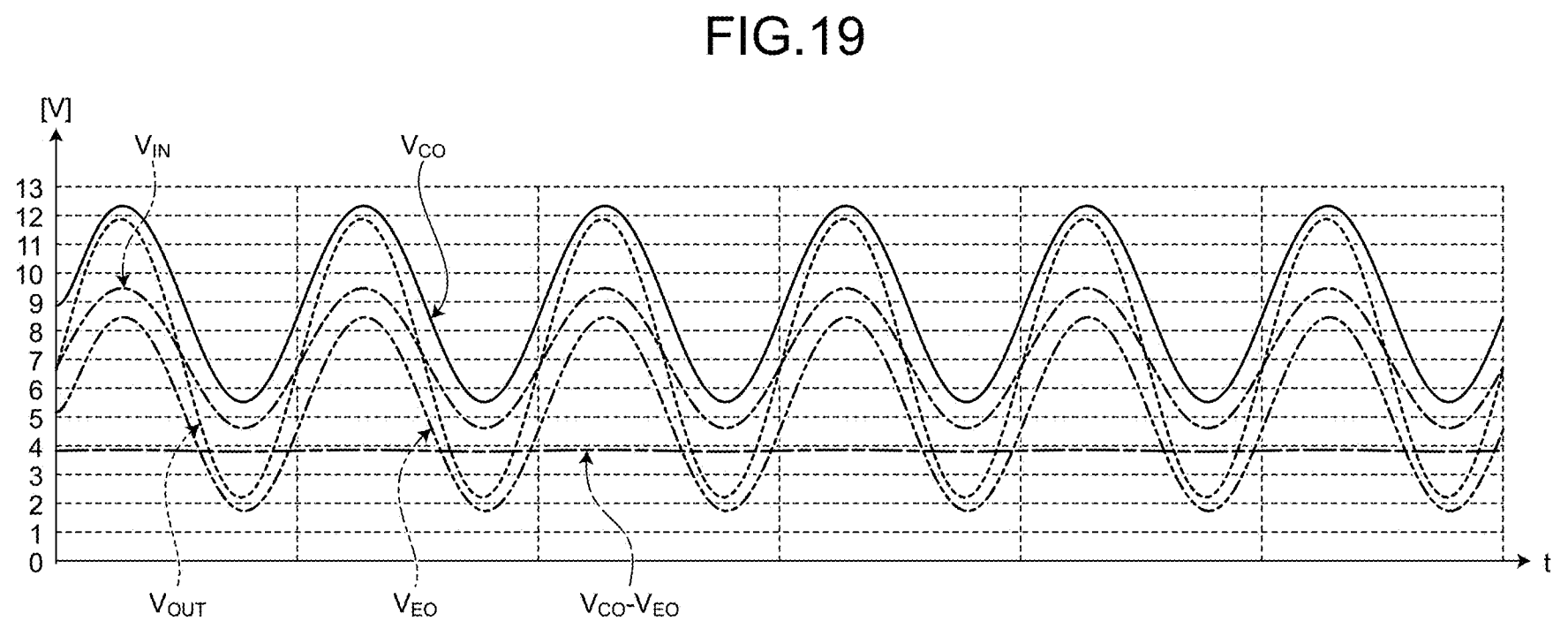

FIG. 16 is a diagram of an exemplary block configuration of the detecting device according to a second embodiment. FIG. 17 is a diagram of a functional circuit block configuration of the detecting device according to the second embodiment. FIG. 18 is a block diagram of an exemplary main configuration of the power supply circuit according to the second embodiment. FIG. 19 is a diagram of an exemplary operation of the power supply circuit according to the second embodiment. The same components as those according to the first embodiment are denoted by like reference numerals, and detailed explanation thereof may be omitted.

In the configuration according to the second embodiment, a power supply circuit 17b includes the first voltage conversion circuit (POW1) 11, the second voltage conversion circuit (POW2) 13, the low-pass filter (LPF) 18, and an amplifier circuit 19a.

The first voltage conversion circuit 11 operates with the first reference potential GND1 as the ground potential. The first voltage conversion circuit 11 converts the potential of the electric power supplied from the processing unit 110 via the power supply line VBUS of the USB cable, for example, into the first power supply potential $V_{CC}$ that is substantially constant with respect to the first reference potential GND1 as the ground potential.

Similarly to the configuration according to the first embodiment, the amplifier circuit 19a is a non-inverting amplifier circuit composed of the operational amplifier OP. The amplifier circuit 19a includes the positive feedback resistor $R_B$ coupled between the non-inverting input terminal and the output terminal of the operational amplifier OP, the negative feedback resistor $R_F$ coupled between the inverting input terminal and the output terminal of the operational amplifier OP, and the ground resistor $R_G$ coupled between the inverting input terminal of the operational amplifier OP and an intermediate potential VCC/2. The second embodiment is different from the first embodiment in that the amplifier circuit 19a is driven by a single power supply using the first power supply potential $V_{CC}$.

In the configuration according to the second embodiment, the amplifier circuit 19a employs a bootstrap circuit composed of a push-pull emitter follower circuit as a power supply for the operational amplifier OP similarly to the configuration according to the first embodiment.

More specifically, the output potential $V_{CO}$ of the NPN emitter follower transistor nTr driven by the voltage division potential between the first power supply potential $V_{CC}$ and the output potential $V_{OUT}$ of the operational amplifier OP is supplied as the positive power supply potential of the operational amplifier OP. The base potential of the NPN emitter follower transistor nTr is biased by the voltage division ratio between the resistor R1, the diode D1, and the resistor R2.

The output potential $V_{CO}$ of the NPN emitter follower transistor nTr is expressed by Expression (1) above when the voltage drop due to the diode D1 and the base-to-emitter voltage (VBE) of the NPN emitter follower transistor nTr are 0.6 V similarly to the first embodiment. In other words, the output potential $V_{CO}$ of the NPN emitter follower transistor nTr is substantially equal to the cathode voltage of the diode D1.

The output potential $V_{CO}$ of the NPN emitter follower transistor nTr is output to the second voltage conversion circuit 13 as the second power supply potential. In FIG. 16, the waveform of the substantially square-wave-shaped second power supply potential (output potential $V_{CO}$) output from the amplifier circuit 19a is schematically illustrated as the waveform SB4.

The output potential $V_{EO}$ of the PNP emitter follower transistor pTr driven by the voltage division potential between the output potential $V_{OUT}$ of the operational amplifier OP and the first reference potential GND1 is supplied as the negative power supply potential of the operational amplifier OP. The base potential of the PNP emitter follower transistor pTr is biased by the voltage division ratio between a resistor R3, a diode D2, and a resistor R4.

Similarly to the first embodiment, the output potential $V_{EO}$ of the PNP emitter follower transistor pTr is expressed by Expression (2) above when the voltage drop due to the diode D2 and the base-to-emitter voltage (VBE) of the PNP emitter follower transistor pTr are 0.6 V. In other words, the output potential $V_{CO}$ of the PNP emitter follower transistor pTr is substantially equal to the cathode voltage of the diode D2.

The output potential $V_{EO}$ of the PNP emitter follower transistor pTr is output to the detection block 10a as the second reference potential GND2. In FIG. 16, the waveform of the substantially square-wave-shaped second reference potential GND2 (output potential $V_{EO}$) output from the amplifier circuit 19a is schematically illustrated as the waveform SB5.

Similarly to the first embodiment, the amplification factor Gain of the operational amplifier OP is expressed by Expression (3) above using the input resistance $R_{IN}$, the positive feedback resistance $R_B$, the negative feedback resistance $R_F$, and the ground resistance $R_G$.

The drive voltage $V_{CO}-V_{EO}$ of the operational amplifier OP is expressed by the following Expression (9) when R1=R4 and R2=R3 are satisfied. Explanation of the method for deriving the following Expression (9) is omitted.

$$V_{CO} - V_{EO} = \frac{R2}{R1 + R2}(V_{CC} - 1.2) \tag{9}$$

FIG. 19 illustrates the operation when the input potential $V_{IN}$ of the low-pass filter 18 is a sinusoidal signal of 200 kHz and the amplitude of the sinusoidal signal is 3.3 V. In FIG. 19, each resistance is adjusted such that the drive voltage $V_{CO}-V_{EO}$ of the operational amplifier OP is approximately 3.7 V, the load current is 37 mA, and the amplitude of the output potential $V_{OUT}$ is approximately 7 V. The potential of an input/output terminal of the operational amplifier OP becomes a potential between the first power supply potential $V_{CC}$ and the first reference potential GND1 because the amplifier circuit 19a according to the second embodiment is driven by a single power supply. Specifically, FIG. 19 illustrates an example where a series potential of the input/output terminal of the operational amplifier OP is approximately 7 V.

Similarly to the first embodiment, as illustrated in FIG. 19, the output potential $V_{OUT}$ of the operational amplifier OP is lower than the positive power supply potential of the operational amplifier OP (output potential $V_{CO}$ of the NPN emitter follower transistor nTr) output to the second voltage conversion circuit 13 as the second power supply potential and is higher than the negative power supply potential of the operational amplifier OP (output potential $V_{EO}$ of the PNP emitter follower transistor pTr) output to a detection block 10b as the second reference potential GND2. In other words, the positive power supply potential of operational amplifier OP (output potential $V_{CO}$ of the NPN emitter follower transistor nTr) output to the second voltage conversion circuit 13 as the second power supply potential is higher than the output potential $V_{OUT}$ of the operational amplifier OP, and the negative power supply potential of the operational amplifier OP (output potential $V_{EO}$ of the PNP emitter follower transistor pTr) output to the detection block 10b as the second reference potential GND2 is lower than the output potential $V_{OUT}$ of the operational amplifier OP.

Similarly to the first embodiment, the second power supply potential (output potential $V_{CO}$) output to the second voltage conversion circuit 13 is a potential obtained by superimposing the substantially constant drive voltage $V_{CO}$–$V_{EO}$ (approximately 3.7 V in FIG. 19) of the operational amplifier OP on the second reference potential GND2 (output potential $V_{EO}$) output to the detection block 10$b$. Therefore, similarly to the configuration according to the first embodiment, the electric power supplied via the first voltage conversion circuit 11$a$ is converted into the power supply potential (second power supply potential $V_{CO}$) that fluctuates in synchronization with the second reference potential GND2 (output potential $V_{EO}$).

In the configuration according to the second embodiment, the amplifier circuit (BST) 19$a$ is driven by a single power supply as described above. The AFE circuit 15 is supplied with the second reference potential GND2 from the amplifier circuit (BST) 19$a$ and operates based on the second power supply potential $V_{CO}$ that is substantially constant with respect to the second reference potential GND2. Therefore, the configuration of the first voltage conversion circuit 11 can be simplified, and the detecting device 1 can be manufactured at a lower cost and in a smaller size than the configuration according to the first embodiment.

In the embodiments described above, a bypass capacitor C1 is provided between the bias point (base) of the NPN emitter follower transistor nTr and the bias point (base) of the PNP emitter follower transistor pTr. With this configuration, the operation of the amplifier circuit 19 (19$a$) can be stabilized.

In the embodiments described above, any one or more of the positive feedback resistor $R_B$, the negative feedback resistor $R_F$, and the ground resistor $R_G$ may be composed of a digital potentiometer. With this configuration, the amplification factor Gain of the operational amplifier OP can be adjusted.

While the NPN emitter follower transistor nTr and the PNP emitter follower transistor pTr according to the embodiments above are bipolar transistors, for example, the embodiments are not limited thereto. Instead of the NPN emitter follower transistor nTr, an n-channel source follower transistor composed of an n-channel metal oxide semiconductor (MOS) thin film transistor (TFT) may be used. Instead of the PNP emitter follower transistor pTr, a p-channel source follower transistor composed of a p-channel MOS TFT may be used.

While exemplary embodiments according to the present invention have been described, the embodiments are not intended to limit the present invention. The contents disclosed in the embodiments are given by way of example only, and various modifications may be made without departing from the spirit of the present invention.

Appropriate modifications made without departing from the spirit of the present invention naturally fall within the technical scope of the present invention. At least one of various omissions, substitutions, and modifications of the components may be made without departing from the gist of the embodiments and the modifications described above.

What is claimed is:

1. A detecting device comprising:
a plurality of sensor electrodes provided to a detection region;
a power supply circuit configured to generate a second reference potential that fluctuates periodically based on a first power supply potential that is substantially constant with respect to a first reference potential serving as a fixed potential and generate a second power supply potential that is substantially constant with respect to the second reference potential;
an AFE circuit configured to supply a drive signal to the sensor electrodes, acquire a detection signal generated in the sensor electrodes, and output a square wave signal in synchronization with the drive signal; and
an isolator,
wherein
the second reference potential is a potential that fluctuates in synchronization with the square wave signal,
the AFE circuit is supplied with the second reference potential from the power supply circuit and operates based on the second power supply potential generated by the power supply circuit,
the AFE circuit is configured to be controlled by an external processing unit through the isolator,
a ground potential of the isolator at a side coupled to the AFE circuit is the second reference potential that fluctuates, and
a ground potential of the isolator at a side to which a signal from the external processing unit is input, is the first reference potential.

2. The detecting device according to claim 1, further comprising:
a peripheral electrode provided around the detection region; and
a shield electrode provided facing the sensor electrodes and the peripheral electrode with a substrate interposed therebetween, wherein
the peripheral electrode and the shield electrode are supplied with the second reference potential.

3. The detecting device according to claim 2, wherein the power supply circuit comprises a low-pass filter configured to suppress a high-frequency component of the square wave signal.

4. The detecting device according to claim 3, wherein the power supply circuit
comprises an operational amplifier coupled to an output stage of the low-pass filter,
generates the second power supply potential higher than an output potential of the operational amplifier, and
generates the second reference potential lower than the output potential of the operational amplifier.

5. The detecting device according to claim 4, wherein the second power supply potential is a positive power supply potential of the operational amplifier, and the second reference potential is a negative power supply potential of the operational amplifier.

6. The detecting device according to claim 5, wherein the power supply circuit comprises:
a positive feedback resistor coupled between a non-inverting input terminal and an output terminal of the operational amplifier;
a negative feedback resistor coupled between an inverting input terminal and the output terminal of the operational amplifier; and
a ground resistor coupled between the inverting input terminal of the operational amplifier and the first reference potential.

7. The detecting device according to claim 6, wherein any one or more of the positive feedback resistor, the negative feedback resistor, and the ground resistor is composed of a digital potentiometer.

8. The detecting device according to claim 4, wherein the power supply circuit is supplied with a first positive power supply potential and a first negative power supply potential that are substantially constant with respect to the first reference potential, an output potential of an NPN emitter follower transistor driven by a voltage division potential between the first positive power supply potential and the output potential of the operational amplifier is supplied as a positive power supply potential of the operational amplifier, and an output potential of a PNP emitter follower transistor driven by a voltage division potential between the output potential of the operational amplifier and the first negative power supply potential is supplied as a negative power supply potential of the operational amplifier.

9. The detecting device according to claim 8, wherein a base of the NPN emitter follower transistor is supplied with the voltage division potential between the first positive power supply potential and the output potential of the operational amplifier, a collector of the NPN emitter follower transistor is supplied with the first positive power supply potential, the positive power supply potential of the operational amplifier is supplied from an emitter of the NPN emitter follower transistor, a base of the PNP emitter follower transistor is supplied with the voltage division potential between the output potential of the operational amplifier and the first negative power supply potential, a collector of the PNP emitter follower transistor is supplied with the first negative power supply potential, and the negative power supply potential of the operational amplifier is supplied from an emitter of the PNP emitter follower transistor.

10. The detecting device according to claim 9, wherein a bypass capacitor is provided between the base of the NPN emitter follower transistor and the base of the PNP emitter follower transistor.

11. The detecting device according to claim 4, wherein the power supply circuit is supplied with a first positive power supply potential and a first negative power supply potential that are substantially constant with respect to the first reference potential, an output potential of an n-channel source follower transistor driven by a voltage division potential between the first positive power supply potential and the output potential of the operational amplifier is supplied as a positive power supply potential of the operational amplifier, and an output potential of a p-channel source follower transistor driven by a voltage division potential between the output potential of the operational amplifier and the first negative power supply potential is supplied as a negative power supply potential of the operational amplifier.

12. The detecting device according to claim 11, wherein a gate of the n-channel source follower transistor is supplied with the voltage division potential between the first positive power supply potential and the output potential of the operational amplifier, a drain of the n-channel source follower transistor is supplied with the first positive power supply potential, the positive power supply potential of the operational amplifier is supplied from a source of the n-channel source follower transistor, a gate of the p-channel source follower transistor is supplied with the voltage division potential between the output potential of the operational amplifier and the first negative power supply potential, a drain of the p-channel source follower transistor is supplied with the first negative power supply potential, and the negative power supply potential of the operational amplifier is supplied from a source of the p-channel source follower transistor.

13. The detecting device according to claim 12, wherein a bypass capacitor is provided between the gate of the n-channel source follower transistor and the gate of the p-channel source follower transistor.

14. The detecting device according to claim 4, wherein the power supply circuit is supplied with the first power supply potential that is substantially constant with respect to the first reference potential, an output potential of an NPN emitter follower transistor driven by a voltage division potential between the first power supply potential and the output potential of the operational amplifier is supplied as a positive power supply potential of the operational amplifier, and an output potential of a PNP emitter follower transistor driven by a voltage division potential between the output potential of the operational amplifier and the first reference potential is supplied as a negative power supply potential of the operational amplifier.

15. The detecting device according to claim 14, wherein a base of the NPN emitter follower transistor is supplied with the voltage division potential between the first power supply potential and the output potential of the operational amplifier, a collector of the NPN emitter follower transistor is supplied with the first power supply potential, the positive power supply potential of the operational amplifier is supplied from an emitter of the NPN emitter follower transistor, a base of the PNP emitter follower transistor is supplied with the voltage division potential between the output potential of the operational amplifier and the first reference potential, a collector of the PNP emitter follower transistor is supplied with the first reference potential, and the negative power supply potential of the operational amplifier is supplied from an emitter of the PNP emitter follower transistor.

16. The detecting device according to claim 15, wherein a bypass capacitor is provided between the base of the NPN emitter follower transistor and the base of the PNP emitter follower transistor.

17. The detecting device according to claim 4, wherein the power supply circuit is supplied with the first power supply potential that is substantially constant with respect to the first reference potential, an output potential of an n-channel source follower transistor driven by a voltage division potential between the first power supply potential and the output potential of the operational amplifier is supplied as a positive power supply potential of the operational amplifier, and an output potential of a p-channel source follower transistor driven by a voltage division potential between the output potential of the operational amplifier and the first reference potential is supplied as a negative power supply potential of the operational amplifier.

18. The detecting device according to claim 17, wherein a gate of the n-channel source follower transistor is supplied with the voltage division potential between the first power supply potential and the output potential of the operational amplifier, a drain of the n-channel source follower transistor is supplied with the first power supply potential, the positive power supply potential of the operational amplifier is supplied from a source of the n-channel source follower transistor, a gate of the p-channel source follower transistor is supplied with the voltage division potential between the output potential of the operational amplifier and the first reference potential, a drain of the p-channel source follower transistor is supplied with the first reference potential, and the negative power supply potential of the operational amplifier is supplied from a source of the p-channel source follower transistor.

19. The detecting device according to claim 18, wherein a bypass capacitor is provided between the gate of the n-channel source follower transistor and the gate of the p-channel source follower transistor.

* * * * *